(12) United States Patent
Haga et al.

(10) Patent No.: US 9,882,452 B2
(45) Date of Patent: Jan. 30, 2018

(54) POWER TOOL HAVING CIRCUIT BOARD

(71) Applicant: HITACHI KOKI CO., LTD., Tokyo (JP)

(72) Inventors: Hiroshi Haga, Hitachinaka (JP); Hideyuki Hashimoto, Hitachinaka (JP); Hideyuki Tanimoto, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 620 days.

(21) Appl. No.: 14/505,146

(22) Filed: Oct. 2, 2014

(65) Prior Publication Data

US 2015/0015094 A1    Jan. 15, 2015

Related U.S. Application Data

(63) Continuation of application No. 13/182,332, filed on Jul. 13, 2011, now Pat. No. 8,928,261.

(30) Foreign Application Priority Data

Jul. 14, 2010    (JP) .................................. 2010-159551

(51) Int. Cl.
*H02P 6/00* (2016.01)
*H02K 7/14* (2006.01)
(Continued)

(52) U.S. Cl.
CPC ........... *H02K 7/145* (2013.01); *B25B 21/002* (2013.01); *B25B 23/1415* (2013.01);
(Continued)

(58) Field of Classification Search
CPC ..... B25F 5/008; B25F 5/006; H02K 11/0073; H02K 7/145; B25B 21/00
See application file for complete search history.

(56) References Cited

U.S. PATENT DOCUMENTS 6,053,080 A    4/2000 Kaneyama et al.
6,102,632 A *  8/2000 Potter ..................... B25F 5/001
                                                173/217

(Continued)

FOREIGN PATENT DOCUMENTS

CN    1773811 A     5/2006
CN    100517917 C   4/2007
(Continued)

OTHER PUBLICATIONS

Notice of Allowance for U.S. Appl. No. 13/182,332 dated Jul. 2, 2014, 10 pages.

(Continued)

*Primary Examiner* — Shawki S Ismail
*Assistant Examiner* — Zoheb Imtiaz

(57) ABSTRACT

A power tool includes a housing, a motor, an output unit, and a circuit board unit. The motor is accommodated in the housing and has a rotational axis extending in a top-bottom direction. The output unit is disposed above the motor and extends in a front-rear direction. A power cable is configured to be connected to a power source and is connected to the circuit board unit. The circuit board unit is accommodated in the housing. The circuit board unit comprises a switching element for driving the motor, and a rectifying device configured to rectify an alternating current from the power source to a direct current. The circuit board unit is disposed below the motor and extends in the front-rear direction in the housing.

7 Claims, 19 Drawing Sheets

(51) Int. Cl.
  *B25B 21/00* (2006.01)
  *B25B 23/14* (2006.01)
  *B25F 5/00* (2006.01)
  *H02K 9/06* (2006.01)
  *H02K 11/33* (2016.01)

(52) U.S. Cl.
  CPC .............. *B25F 5/008* (2013.01); *H02K 9/06* (2013.01); *H02K 11/33* (2016.01)

(56) References Cited

U.S. PATENT DOCUMENTS

| | | | |
|---|---|---|---|
| 6,123,158 | A | 9/2000 | Steffen |
| 6,866,105 | B2 | 3/2005 | Pfisterer et al. |
| 6,902,012 | B2 | 6/2005 | Kristen et al. |
| 7,055,620 | B2 | 6/2006 | Nadig et al. |
| 7,768,750 | B2 | 8/2010 | Uchida |
| 8,084,901 | B2 | 12/2011 | Oomori et al. |
| 8,338,997 | B2 | 12/2012 | Nishikawa |
| 2003/0127932 | A1* | 7/2003 | Ishida ................. B25F 5/00 310/184 |
| 2004/0124721 | A1* | 7/2004 | Pfisterer ............... B25D 17/20 310/51 |
| 2006/0097602 | A1 | 5/2006 | Tanimoto et al. |
| 2006/0255756 | A1* | 11/2006 | Iwata ................... B25F 5/008 318/400.41 |
| 2008/0135268 | A1* | 6/2008 | Tadokoro ............ B25F 5/008 173/2 |
| 2009/0229957 | A1 | 9/2009 | Nishiyama et al. |
| 2009/0275273 | A1* | 11/2009 | Purohit ................ B24B 23/03 451/357 |
| 2010/0026107 | A1 | 2/2010 | Hosokawa |
| 2010/0117580 | A1* | 5/2010 | Miwa ................... B25F 5/00 318/472 |
| 2010/0117581 | A1* | 5/2010 | Miwa ................... H02P 29/032 318/472 |
| 2010/0253162 | A1 | 10/2010 | Sakamaki et al. |
| 2010/0283332 | A1* | 11/2010 | Toukairin ............. B25F 5/008 310/50 |
| 2010/0308673 | A1* | 12/2010 | Purohit ................ B24B 23/03 310/50 |
| 2011/0037422 | A1* | 2/2011 | Pollock ................ H02P 6/10 318/400.34 |
| 2011/0248583 | A1* | 10/2011 | O'Banion ............ B25B 21/00 310/50 |
| 2011/0273118 | A1* | 11/2011 | Bonner ................ H02M 1/4225 318/400.3 |
| 2012/0014065 | A1* | 1/2012 | Haga ................... B25B 21/002 361/697 |
| 2013/0119792 | A1 | 5/2013 | Nishiyama et al. |

FOREIGN PATENT DOCUMENTS

| | | |
|---|---|---|
| CN | 101181787 A | 5/2008 |
| CN | 101637826 A | 2/2010 |
| EP | 2085191 A1 | 8/2009 |
| JP | 07-37581 U | 7/1995 |
| JP | 10-156745 A | 6/1998 |
| JP | 11-129162 A | 5/1999 |
| JP | 11-156741 A | 6/1999 |
| JP | 2000-515435 A | 11/2000 |
| JP | 2001-353668 A | 12/2001 |
| JP | 2002-039885 A | 2/2002 |
| JP | 2003-199310 A | 7/2003 |
| JP | 2004-001233 A | 1/2004 |
| JP | 2004-098282 A | 4/2004 |
| JP | 2004-518551 A | 6/2004 |
| JP | 2005-514888 A | 5/2005 |
| JP | 2005-193310 A | 7/2005 |
| JP | 2006-060140 A | 3/2006 |
| JP | 2007-136607 A | 6/2007 |
| JP | 2008-173712 A | 7/2008 |
| JP | 2008-173716 A | 7/2008 |
| JP | 2008-193865 A | 8/2008 |
| JP | 2008-296306 A | 12/2008 |
| JP | 2008-307664 A | 12/2008 |
| JP | 2009-095902 A | 5/2009 |
| JP | 2009-214260 A | 9/2009 |
| JP | 2009-240023 A | 10/2009 |
| JP | 2009-274195 A | 11/2009 |
| JP | 2010-058186 A | 3/2010 |
| JP | 2010-120120 A | 6/2010 |
| WO | WO03055044 A1 | 7/2003 |

OTHER PUBLICATIONS

Final Office Action for U.S. Appl. No. 13/182,332 dated Nov. 26, 2013, 17 pages.
Non-Final Office Action for U.S. Appl. No. 13/182,332 dated Apr. 29, 2013, 17 pages.
Japan Patent Office Notification of Transmittal of Duplicate of Rebuttal for patent No. JP5534562 dated Apr. 12, 2016.
Japan Patent Office office action for patent application JP2014-092464 (dated Mar. 2, 2015).
Office Action from China Intellectual Property Office for application 201110196772.3 (dated Jul. 3, 2013).
Japan Patent Office office action for application 2010-159551 (dated Jan. 16, 2014).

* cited by examiner

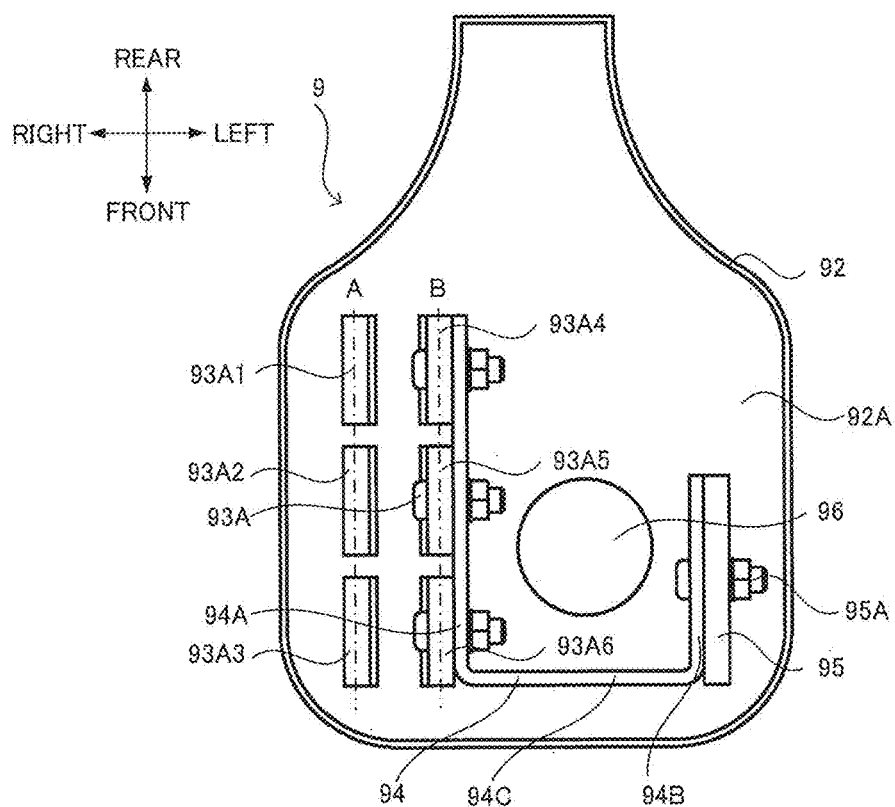
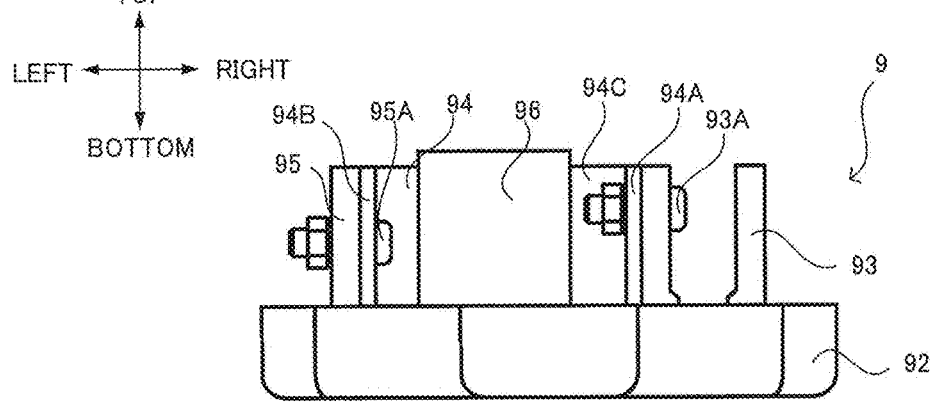

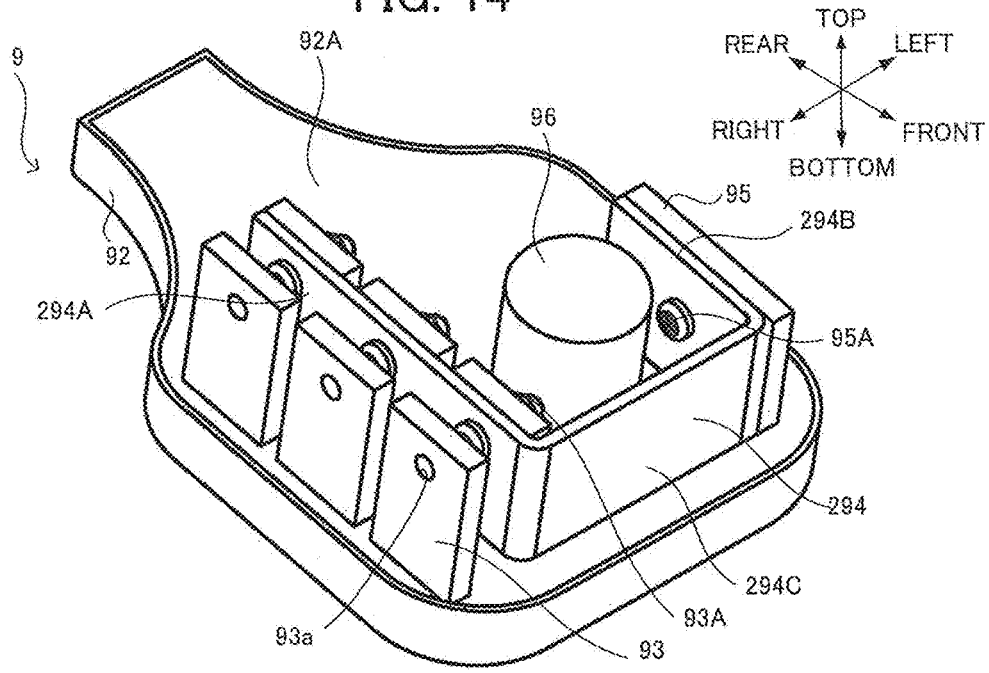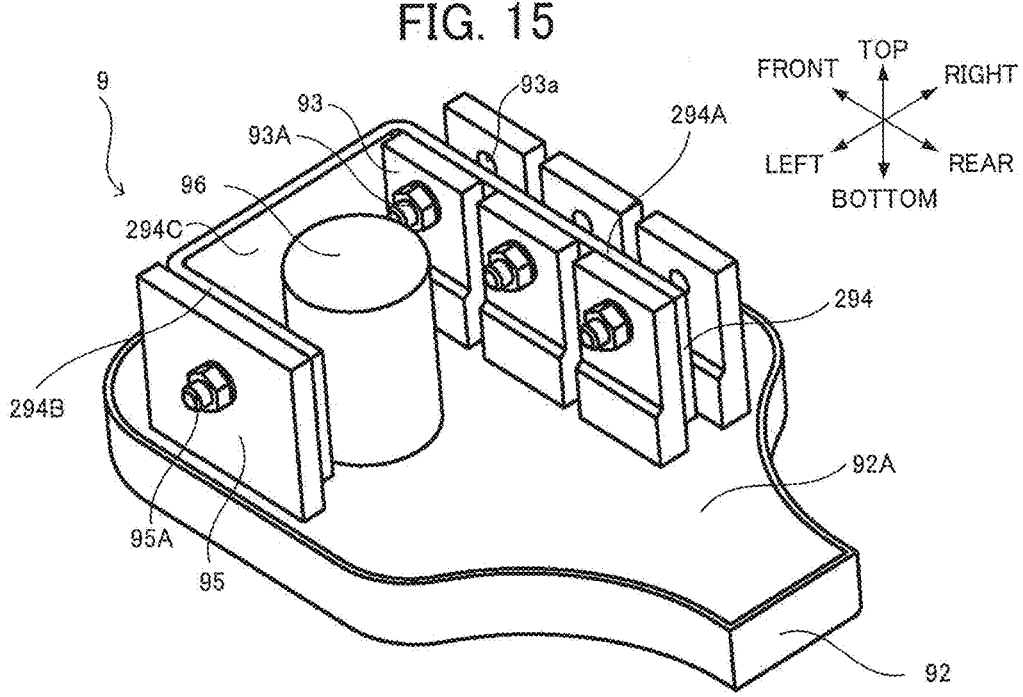

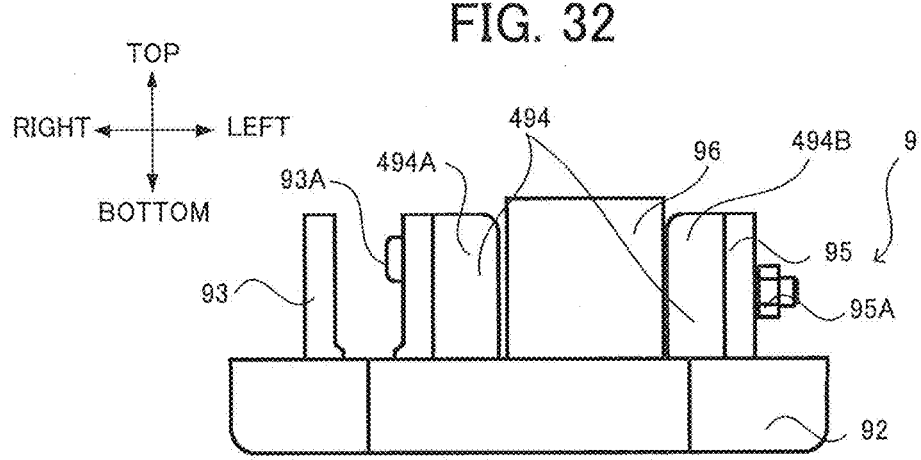
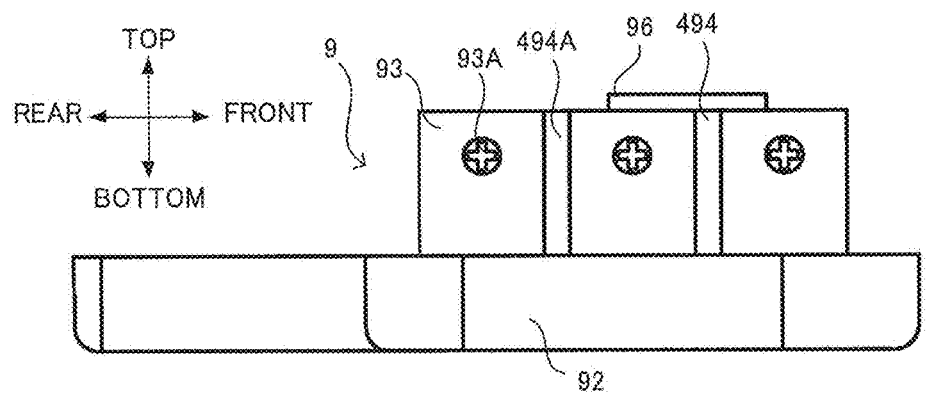
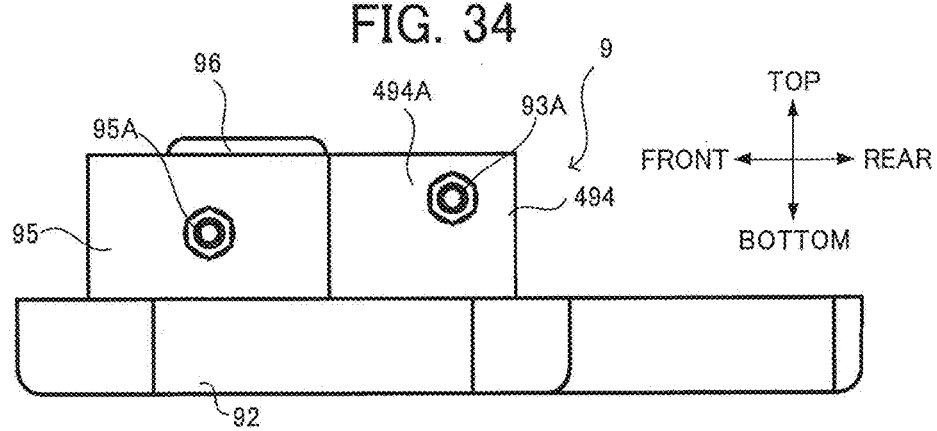

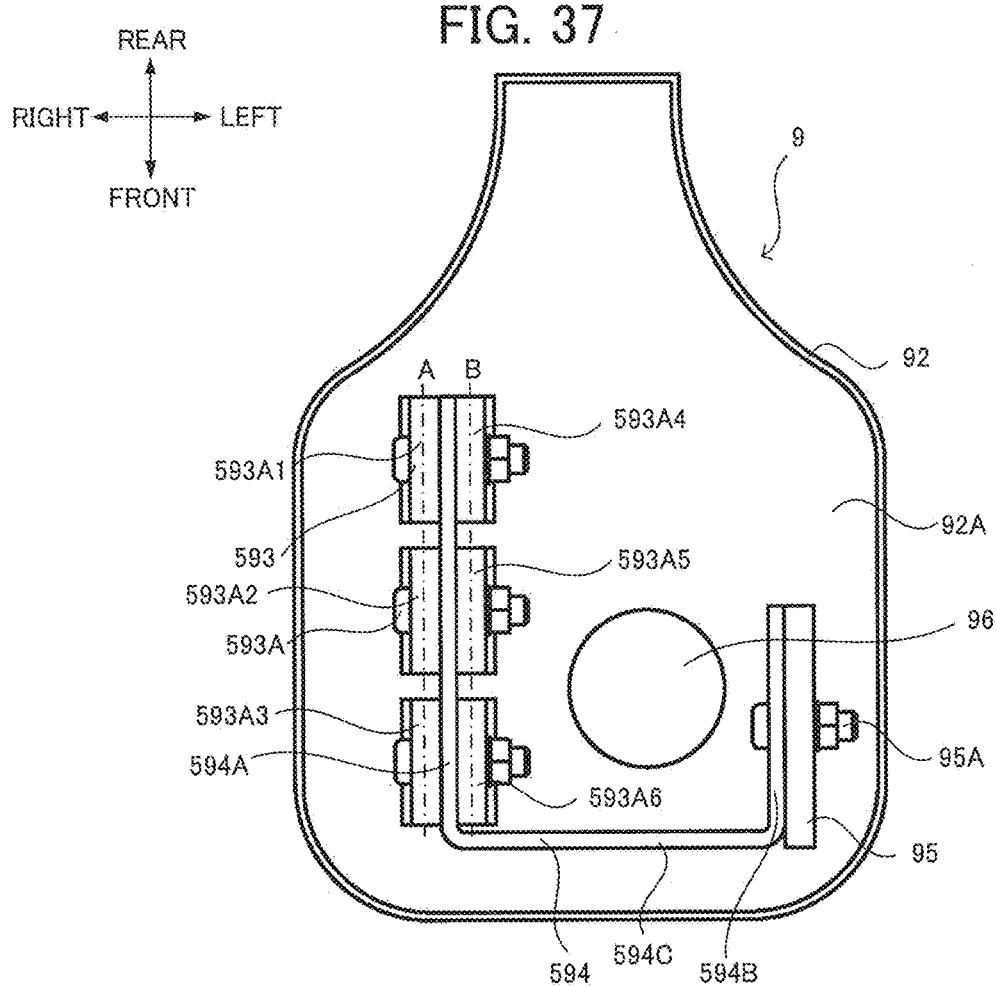
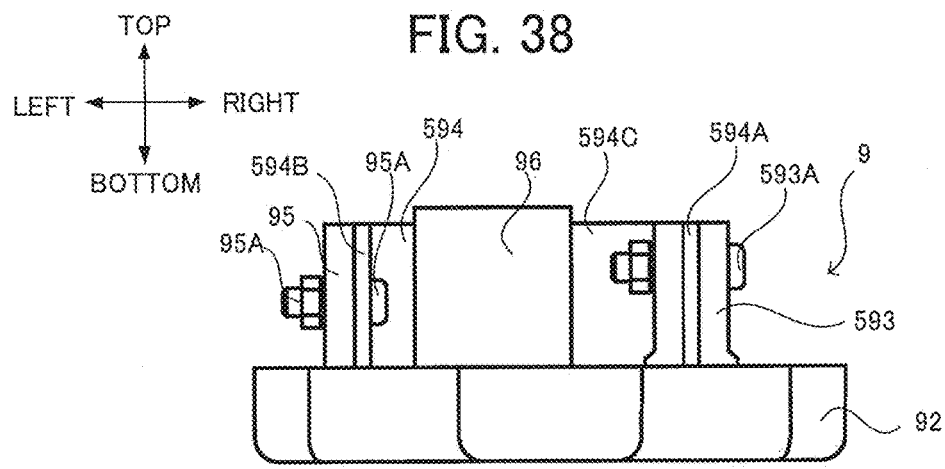

POWER TOOL HAVING CIRCUIT BOARD

CROSS REFERENCE TO RELATED APPLICATION

This application claims priority from Japanese Patent Application No. 2010-159551 filed Jul. 14, 2010. This application is a continuation application of U.S. patent application Ser. No. 13/182,332 filed Jul. 13, 2011. The contents of these applications are incorporated herein by reference.

TECHNICAL FIELD

The present invention relates to a circuit board and a power tool having the circuit board, and more particularly, to a bolt tightening tool for tightening a high-tension bolt.

BACKGROUND

Conventionally, a high-tension bolt or a high-tension strength bolt is used for tightening structural members with each other while constructing a bridge, an iron frame construction, or the like. The high-tension bolt is tightened by a bolt tightening tool (shear wrench) disclosed in, for example, laid-open Japanese Patent Application Publication No. 2004-001233.

The shear wrench includes a housing, a circuit board, a commutator motor accommodated in the housing, a drive transmission mechanism, an inner socket, an outer socket, and a trigger. When an operator pulls the trigger, the commutator motor is driven, and the inner socket fitted to a tip of the high-tension bolt is rotated by way of the transmission mechanism, and the outer socket fitted to a nut is rotated in a direction opposite to the rotational direction of the inner socket. As a result, the high-tension bolt is tightened.

SUMMARY

However, the continuous use of the shear wrench causes the commutator motor and components on the circuit to raise their temperature, so that the commutator motor and the components may be broken by the heat.

Therefore, it is an object of the present invention to provide a power tool capable of enhancing a cooling efficiency to a motor and a circuit board.

In order to attain the above and other objects, the invention provides a power tool. The power tool includes a housing, a motor, an output unit, and a circuit board unit. The motor is accommodated in the housing and has a rotational axis extending in a top-bottom direction. The output unit is disposed above the motor and extends in a front-rear direction. A power cable is configured to be connected to a power source and is connected to the circuit board unit. The circuit board unit is accommodated in the housing. The circuit board unit includes a switching element for driving the motor, and a rectifying device configured to rectify an alternating current from the power source to a direct current. The circuit board unit is disposed below the motor and extends in the front-rear direction in the housing.

According to another aspect, the present invention provides a power tool. The power tool includes a housing, an output unit, and a circuit board unit. The housing includes a motor housing, a handle housing disposed rearward of the motor housing, and a connected portion connecting the motor housing to the handle housing. The motor housing accommodates therein a motor and extends in a top-bottom direction. The handle housing extends in the top-bottom direction. The output unit is disposed above the motor and extends in a front-rear direction. A power cable is configured to be connected to a power source and is connected to the circuit board unit. The circuit board unit is disposed below the motor. The circuit board unit includes switching element for driving the motor, and a rectifying device configured to rectify an alternating current from the power source to a direct current. The circuit board unit is disposed at the connected portion and extends in the front-rear direction in the housing.

According to another aspect, the present invention provides a power tool. The power tool includes a motor, an output unit, and a circuit board unit. The output unit is configured to be driven by the motor. A power cable is configured to be connected to a power source and is connected to the circuit board unit. The circuit board unit includes a single circuit board on which a switching element for driving the motor and a rectifying device is mounted. The rectifying device is configured to rectify an alternating current from the power source to a direct current.

BRIEF DESCRIPTION OF THE DRAWINGS

The particular features and advantages of the invention as well as other objects will become apparent from the following description taken in connection with the accompanying drawings, in which:

FIG. 9 is a plane view showing the circuit board unit in the shear wrench according to the first embodiment;

FIG. 10 is a rear view showing the circuit board unit in the shear wrench according to the first embodiment;

FIG. 14 is a front perspective view showing a circuit board unit in a shear wrench according to a second embodiment of the present invention;

FIG. 15 is a rear perspective view showing the circuit board unit in the shear wrench according to the second embodiment;

FIG. 32 is a front view showing the circuit board unit in the shear wrench according to the fourth embodiment;

FIG. 33 is a right side view showing the circuit board unit in the shear wrench according to the fourth embodiment;

FIG. 34 is a left side view showing the circuit board unit in the shear wrench according to the fourth embodiment;

FIG. 37 is a plane view showing the circuit board unit in the shear wrench according to the fifth embodiment;

FIG. 38 is a rear view showing the circuit board unit in the shear wrench according to the fifth embodiment;

DETAILED DESCRIPTION

Figure 1:
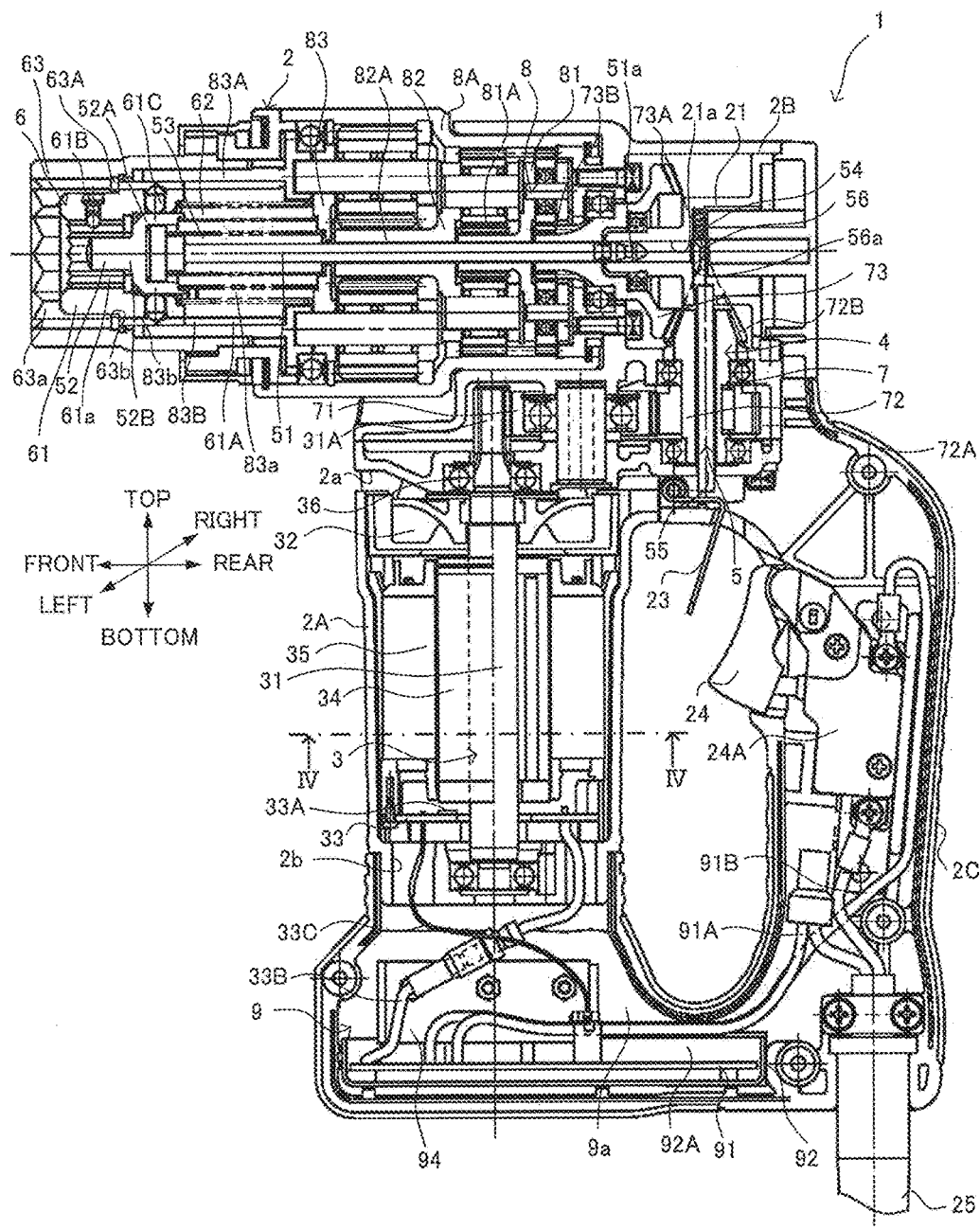
FIG. 1 is a cross-sectional view of a shear wrench as viewed from lateral side according to a first embodiment of the present invention.

A bolt tightening tool (shear wrench) as an example of a power tool according to a first embodiment of the present invention will be described with reference to FIGS. 1-13. The shear wrench 1 includes a housing 2, a brushless motor 3, a rotational drive transmission mechanism 4, a bolt-tip discharging mechanism 5, a socket unit 6, and a circuit board unit 9.

The housing 2 constitutes an outer shell of the shear wrench 1 and mainly includes a motor housing 2A, a gear case 2B, and a handle housing 2C. The motor housing 2A extends from the gear case 2B in a direction perpendicular to a longitudinal direction of the gear case 2B. In the following description, an extending direction of the motor housing 2A from the gear case 2B will be referred to as "downward" direction, and a direction opposite to the downward direction will be referred to as "upward" direction. Further, a direction toward the socket unit 6 from the gear case 2B will be referred to as a "forward" direction, and a direction opposite to the forward direction will be referred to as a "rearward" direction. Further, directions orthogonal to forward and rearward directions and upward and downward directions will be referred to as "leftward" and "rightward" direction.

The motor housing 2A is a cylindrical member made from resin and extends in top-to-bottom direction. The motor housing 2A has an upper portion formed with an outlet port 2a and a lower portion formed with a ventilation port 2b in communication with the handle housing 2C. The motor housing 2A is provided at front side of the handle housing 2C and extends downward from the gear case 2B.

The brushless motor 3 is accommodated in the motor housing 2A and mainly includes a rotational shaft 31 extending vertically, a cooling fan 32, a circuit board 33, a rotor 34, and a stator 35. The rotational shaft 31 is rotatably supported through motor hearings 36 and has an upper end portion provided with a pinion gear 31A. The cooling fan 32 is coaxially fixed to the rotational shaft 31. The circuit board 33 is provided at a lower portion of the brushless motor 3 and has a hall element 33A for detecting an angular position of the rotor 34. The circuit board 33 is electrically connected to the circuit board unit 9 via a power cable 33B and a communication cable 33C passing through the ventilation port 2b. The power cable 33B is a cable for supplying an electric power (electric current) to a coil 35A described later on the circuit board 33, and the communication cable 33C is a cable for acquiring a signal at the circuit board unit 9 from the hall element 33A.

Figure 4:
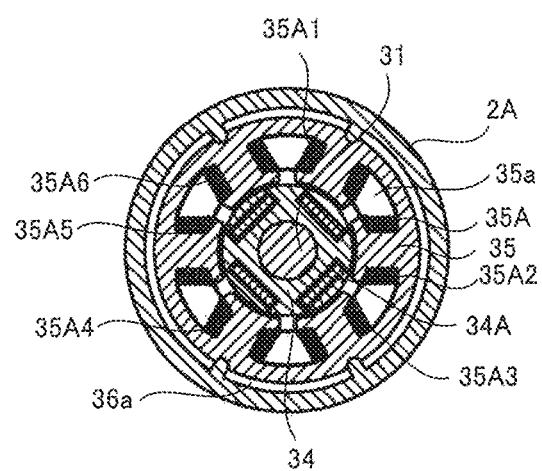
FIG. 4 is a cross-sectional view of the shear wrench taken along a line IV-IV in FIG. 1 according to the first embodiment.

As shown in FIG. 4, the rotor 34 is coaxially fixed to the rotational shaft 31 and two-pairs of permanent magnets 34A are provided in the rotor 34. The motor housing 2A has an inner circumferential surface provided with a plurality of ribs for supporting the stator 35 having a coil 35A. The coil 35A is configured of six coils 35A1-35A6. The six coils 35A1-35A6 are positioned so that the coil 35A1 is positioned diametrically opposite to the coil 35A4 with respect to the rotor 34, and the coil 35A2 is opposite to the coil 35A5 with respect to the rotor 34, and the coil 34A3 is opposite to the coil 35A6 with respect to the rotor 34. A clearance 35a is formed between neighboring coils 35A, and a gap 36a is formed between an outer surface of the stator 35 and the inner peripheral surface of the motor housing 2A. Therefore, cooling to the brushless motor 3 can be performed by air flow generated by the rotation of the cooling fan 32 and passing through the clearance 35a and the gap 36a.

The gear case 2B is made of aluminum (metal) and, as shown in FIG. 1, accommodates therein the rotational drive transmission mechanism 4 and the bolt-tip discharging mechanism 5. The rotational drive transmission mechanism 4 extends in front-to-rear direction, and includes a gear mechanism 7 and a planetary gear mechanism 8. A rod cover 21 is provided rearward of the gear case 2B and formed with an insertion hole 21a extending in front-to-rear direction into which a rear end portion of a rod 51 described later is inserted. The insertion hole 21a has an inner diameter slightly larger than an outer diameter of the rod 51. The gear case 2B and the motor housing 2A are fixed to each other by a screw (not shown).

The gear mechanism 7 is positioned rearward of the planetary gear mechanism 8 and includes a first gear 71 meshingly engaged with the pinion gear 31A, a second gear unit 72 meshingly engaged with the first gear 71, and a third gear unit 73 meshingly engaged with the second gear unit 72. The first gear 71 is a spur gear and rotatably supported to the housing 2. The first gear 71 has a rotational shaft extending parallel to the rotational shaft 31. The second gear unit 72 includes a second gear 72A that is a spur gear meshingly engaged with the first gear 71 and a first bevel gear 72B rotated coaxially and integrally with the second gear 72A. The second gear unit 72 has a rotational shaft extending parallel to the rotational shaft of the first gear 71 and is rotatably supported to the housing 2 via bearings. The second gear unit 72A is formed with a through hole penetrating in top-to-bottom direction into which a plate rod 55 described later is inserted.

The third gear unit 73 includes a second bevel gear 73A meshingly engaged with the first bevel gear 72B and a first sun gear 73B positioned forward of the second bevel gear 73A. The first sun gear 73B is rotatable coaxially and integrally with the second bevel gear 73A. The third gear unit 73 is rotatably supported to the rod cover 21 and has a rotational center portion formed with a through hole extending in front-to-rear direction. The rod 51 is inserted through the through hole.

The planetary gear mechanism 8 includes a first gear unit 81, a second gear unit 82, a third gear unit 83, and an outer unit 8A serving as a ring gear. The first gear unit 81 is positioned forward of the third gear unit 73, and includes a second sun gear 81A for outputting decreased rotation of the first sun gear 73B and a first gear unit 81 that orbits about the first sun gear 73B as a sun gear while meshingly engaged with the outer unit 8A as a ring gear. The second gear unit 82 is positioned forward of the first gear unit 81, and includes a third sun gear 82A for outputting decreased rotation of the second sun gear 81A and a second planetary gear 82B that orbits about the second sun gear 81A as a sun gear while meshingly engaged with the outer unit 8A as a ring gear. The third gear unit 83 is positioned forward of the second gear unit 82, and includes an output unit 83A for outputting decreased rotation of the third sun gear 82A and a third planetary gear 83C that orbits about the third sun gear 82A as a sun gear while meshingly engaged with the outer unit 8A as a ring gear.

The output unit 83A is formed with a front opening and defines therein a socket accommodating space 83a capable of accommodating the inner socket 61 and an weight 52 described later. The output unit 83A has an inner surface provided with a spline receiving part 83B configured of a plurality of concave parts extending in front-to-rear direction. A ball receiving space 83b is defined immediately forward of the spline receiving part 83B to receive a ball 61C described later. The first-third gear units 81-83 are respectively formed with through holes extending in front-to-rear direction in communication with one another. The through hole in the third gear unit 83 has a front opening located within the socket accommodating space 83a. The through hole in the first gear unit 81 has a rear opening in confrontation with the first sun gear 73B and in communication with the through hole in the third gear unit 73.

The outer unit 8A is provided with a gear engaged with the first-third planetary gears 81-83 and rotatably supported to the third gear unit 83 via a bearing. Thus, the outer unit 8A is rotatable and immovable in front-to-rear direction relative to the housing 2.

The bolt-tip discharging mechanism 5 includes the bar-shaped rod 51, the weight 52, a the through hole in the third gear unit 73.n weight spring 53 for forwardly biasing the weight 52, a spring 54, the plate rod 55, and a plate 56. The rod 51 has an outer diameter slightly smaller than an inner diameter of the insertion hole 21a, a front end portion fixedly provided with the weight 52, and a rear end portion formed with a concave part 51a. The rod 51 is inserted into the through holes formed in the first-third planetary gears 81, 82, and 83 so that the rear end portion including the concave part 51a is positioned at the insertion hole 21a.

The weight 52 is accommodated in the socket accommodating space 83a and is configured of a seat portion 52A urged by the weight spring 53 and a pressing portion 52B positioned forward of the seat portion 52A. The weight spring 53 is located within the socket accommodating space 83a. The weight spring 53 has a front end portion in abutment with the seat portion 52A and a rear end portion in abutment with a rear surface of the socket accommodating space 83a so as to bias the weight 52 forward.

The spring 54 is located rearward of the gear case 2B and is supported to the rod cover 21. The plate rod 55 is of a bar shape and disposed within the through hole in the second gear unit 72 with its longitudinal direction aligned in top-to-bottom direction. The plate rod 55 has an upper end portion abuttable against a lower end portion of the plate 56 and a lower end portion abuttable against a lever 23 described later.

The plate 56 is located between the spring 54 and the plate rod 55 and urged downward by the spring 54. The plate 56 is formed with a through hole 56a having an inner diameter slightly larger than that of the insertion hole 21a, allowing the rod 51 to be insertable into the through hole 56a.

The socket unit 6 mainly includes the inner socket 61, a socket spring 62, and an outer socket 63. The inner socket 61 includes a spline part 61A, a tip pressing part 61B, and the ball 61C, and is capable of being accommodated within the socket accommodating space 83a. The inner socket 61 has a front end portion defining a tip accommodating space 61a and an outer surface provided with a stepped portion abuttable against an inner socket restricting member 63A described later positioned at substantially front-to-rear center of the inner socket 61. The socket unit 6 serves as an output unit of the present invention.

Figure 5:
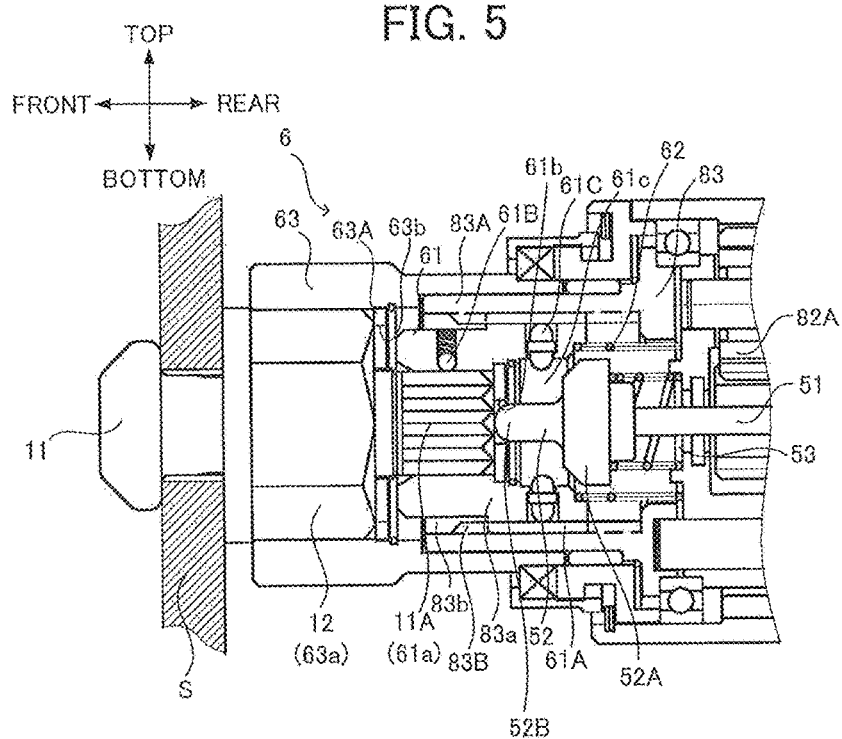
FIG. 5 is an enlarged cross-sectional view ambient to a socket unit fitting with a high-tension bolt in the shear wrench according to the first embodiment.

The tip accommodating space 61a opens toward the front side of the inner socket 61 and retains a bolt tip 11A of a high-tension bolt 11 as shown in FIG. 5. A peripheral surface of the tip accommodating space 61a is formed with a spline groove engageable with a spline of the bolt tip 11A. Thus, the inner socket 61 is rotatable together with the bolt tip 11A. A rear surface portion of the tip accommodating space 61a is formed with an opening 61b through which the pressing portion 52B of the weight 52 is protrudable toward the tip accommodating space 61a. A seat portion accommodating space 61c capable of accommodating the seat portion 52A is defined behind the opening 61b.

The spline part 61A is provided at the rear side and on the outer surface of the inner socket 61 and is meshingly engaged with the spline receiving part 83B in the socket accommodating space 83a. The inner socket 61 is unrotatable and movable in front-to-rear direction relative to the output unit 83A. Thus, the inner socket 61 rotates integrally with the output unit 83A.

The tip pressing part 61B includes a ball disposed in a hole formed at a front portion of the inner socket 61, and a spring for urging the ball downward. The ball urged by the spring protrudes to the tip accommodating space 61a and presses the bolt tip 11A accommodated in the tip accommodating space 61a, which causes the bolt tip 11A to be retained therein.

The ball 61C is vertically moveable in a hole penetrating from an outer surface of the inner socket 61 to an inner surface of the seat portion accommodating space 61c. The ball 61C is configured to abut against the seat portion 52A and partially protrude from the outer surface of the inner socket 61 (FIG. 1) when the seat portion 52A is placed at the seat portion accommodating space 61c. In this state, even if the inner socket 61 is urged to be inserted into the socket accommodating space 83a, a part of the ball 61C protruding to the ball receiving space 83b comes into contact with the spline receiving part 83B.

Figure 6:
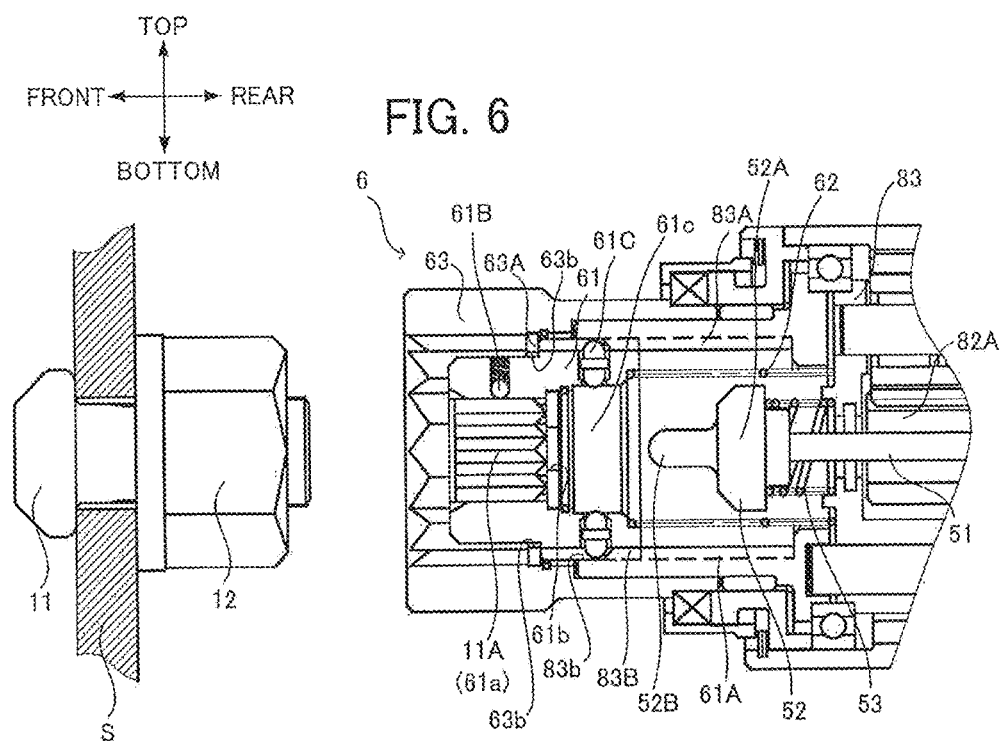
FIG. 6 is an enlarged cross-sectional view ambient to the socket unit when the high-tension bolt in the shear wrench has been tightened according to the first embodiment.

Consequently, the inner socket 61 cannot move rearward. On the other hand, when the seat portion 52A is retracted from the seat portion accommodating space 61c, the ball 61C can move in top-to-bottom direction. As a result, the inner socket 61 can move rearward (FIG. 6).

The socket spring 62 is accommodated in the socket accommodating space 83a with accommodating the weight 52 and the weight spring 53 therein. The socket spring 62 has a front end portion in abutment with the inner socket 61 and a rear end portion in abutment with the rear surface portion of the socket accommodating space 83a so as to bias the inner socket 61 frontward.

The outer socket 63 is fixedly connected to the outer unit 8A and integrally rotatable with the same. The outer socket 63 has a front portion defining a nut accommodating space 63a and includes the inner socket restricting member 63A. The nut accommodating space 63a opens toward the front side of the outer socket 63 and is engageable with a nut 12. Thus, the outer socket 63 integrally rotates with the nut 12. The inner socket restricting member 63A is provided at a rear surface portion of the nut accommodating space 63a and formed with an opening 63b into which the front portion of the inner socket 61 is insertable. As shown in FIG. 6, when the front portion of the inner socket 61 is inserted into the opening 63b, the stepped portion on the outer surface of the inner socket 61 is in abutment with the inner socket restricting member 63A, preventing the inner socket 61 urged by the socket spring 62 from falling in the nut accommodating space 63a.

Figure 2:
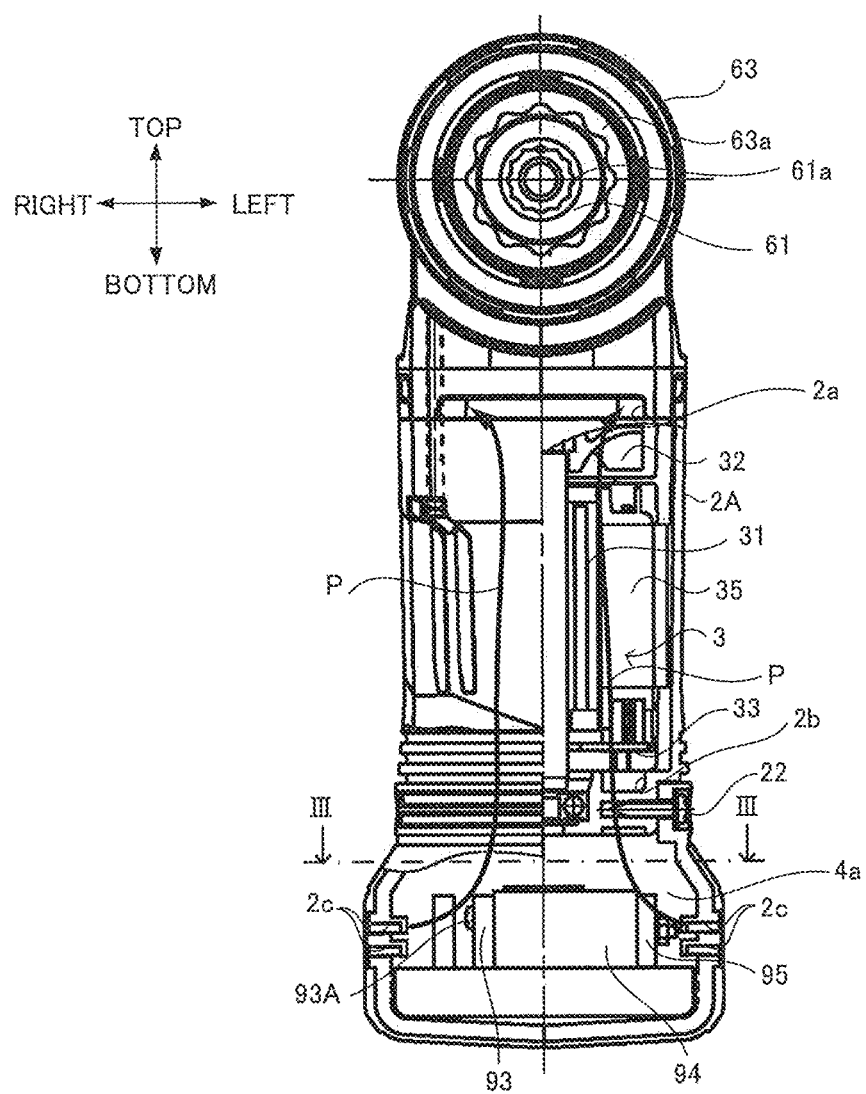
FIG. 2 is a partial cross-sectional view of the shear wrench as viewed from front side according to the first embodiment.
Figure 3:
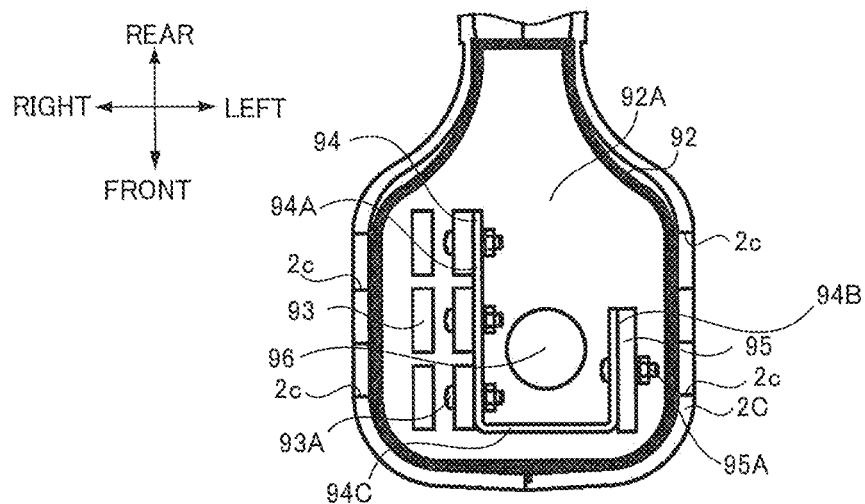
FIG. 3 is a cross-sectional view of the shear wrench taken along a line III-III in FIG. 2 according to the first embodiment.

The handle housing 2C has a cross-section substantially shaped like a letter L. The handle housing 2c has an upper portion fixedly connected to the gear case 2B by a screw (not shown), and a lower portion fixedly connected to the lower portion of the motor housing 2A by a screw 22 as shown in FIG. 2. The handle housing 2C is formed with eight intake ports 2c. Specifically, two intake ports 2c are positioned in top-to-bottom direction (FIG. 2) and four intake ports 2c are positioned on a plane taken along a line III-III in FIG. 2 (FIG. 3). The cooling to the brushless motor 3 is performed by cooling air suctioned through the intake port 2c, passing through the ventilation port 2b, the clearance 35a (FIG. 4), and the gap 36a (FIG. 4) to cool the circuit board unit 9, the circuit board 33, and the brushless motor 3, and is exhausted through the outlet port 2a (see arrow P in FIG. 2). The arrow P serves as an air flow path of the present invention. The handle housing 2C defines therein a circuit board unit accommodating space 9a for accommodating the circuit board unit 9 which controls the brushless motor.

The lever 23 is located at a connecting portion between the handle housing 2C and the gear case 2B, and a part of the lever 23 protrudes outside of the handle housing 2C. The lever 23 is provided for operating the bolt-tip discharging mechanism 5. Upon pulling the lever 23 by the operator, the lever 23 pivots upward and then the plate rod 55 and the plate 56 are moved upward against the urging force of the spring 54. Specifically, as shown in FIG. 1 (lever 23 does not pivot), a center of the through hole 56a is offset from that of the insertion hole 21a. When the lever 23 is pulled, and pivots upward, the plate rod 55 is pressed by the lever 23 and the plate 56 moves upward against the urging force of the spring 54. By this movement, the center of the through hole 56a is coincident with that of the insertion hole 21a.

The handle housing 2C is equipped with a trigger 24 for switching a power supply to the brushless motor 3. The trigger 24 is electrically connected to a switch mechanism 24A accommodated in the handle housing 2C. The handle housing 2C has a lower portion from which a power cable 25 connectable with a power source (not shown) extends.

As shown in FIGS. 7 to 13, the circuit board unit 9 includes a circuit board 91 (FIG. 1), a circuit board support member 92, a plurality of switching elements 93, a heat releasing member 94, a diode bridge 95, and a capacitor 96. As shown in FIG. 1, the circuit board 91 extends in front-to-rear direction and is accommodated in the circuit board support member 92 having a vessel shape. The circuit board 91 is electrically connected to the power cable 25 via an electric cable 91A, and connected to the switch mechanism 24A via an electric cable 91B. The circuit board 91 has a microcomputer (not shown) for controlling the brushless motor 3.

The circuit board support member 92 has a cross-section substantially shaped like a letter U as viewed in a widthwise direction, and a depth capable of accommodating the circuit board 91. The circuit board support member 92 is filled with an urethane resin 92A in order to fix the circuit board 91 to the circuit board support member 92, to enhance vibration absorption of the circuit board 91, and to ensure an electrical insulation of components mounted on the circuit board 91. The circuit board support member 92 is supported in the handle housing 2C by a plurality of ribs (not shown). In the first embodiment, a field effect transistor (FET) is employed as the switching element 93. The diode bridge 95 (bridge diode) is configured of four conventional diodes and is adapted to rectify an alternate current from a commercial power source to a direct current. The diode bridge 95 serves as a rectifying device of the present invention.

The plurality of switching elements 93 is configured of six switching elements 93A1-93A6 and is adapted to supply the electric power to the stator 35 to control the rotation of the brushless motor 3. As shown in FIG. 3, the switching element 93 is disposed adjacent to the right side intake ports 2c. Specifically, as shown in FIG. 9, the switching elements 93A1-93A3 are juxtaposed in front-to-rear direction (chain-line as indicated by an array A) and the switching elements 93A4-93A6 are juxtaposed in front-to-rear direction (chain-line as indicated by an array B) apart from the array A at a prescribed distance.

The switching elements 93A1-93A3 on the array A are electrically and respectively connected to the coils 35A1-35A3, and the switching elements 93A4-93A6 on the array B are electrically and respectively connected to the coils 35A4-35A6. The switching element 93A1 and the switching element 93A4 simultaneously distribute the electric power to the coil 35A1 and the coil 35A4 respectively, the switching element 93A2 and the switching element 93A5 simultaneously distribute an electric power to the coil 35A2 and the coil 35A5 respectively, and the switching element 93A3 and the switching element 93A6 simultaneously distribute an electric power to the coil 35A3 and the coil 35A6 respectively.

The switching element 93 has a rectangular cross-section in a direction orthogonal to the vertical direction. The rectangular cross-section has a long or major side extending in front-to-rear direction, and a short or minor side extending in right-to-left direction. As shown in FIG. 3, the switching element 93 on the array A has a rightward long side surface in confrontation with the intake port 2c to efficiently receive cooling air passing therethrough, so that a cooling efficiency to the switching element 93 can be enhanced.

Figure 7:
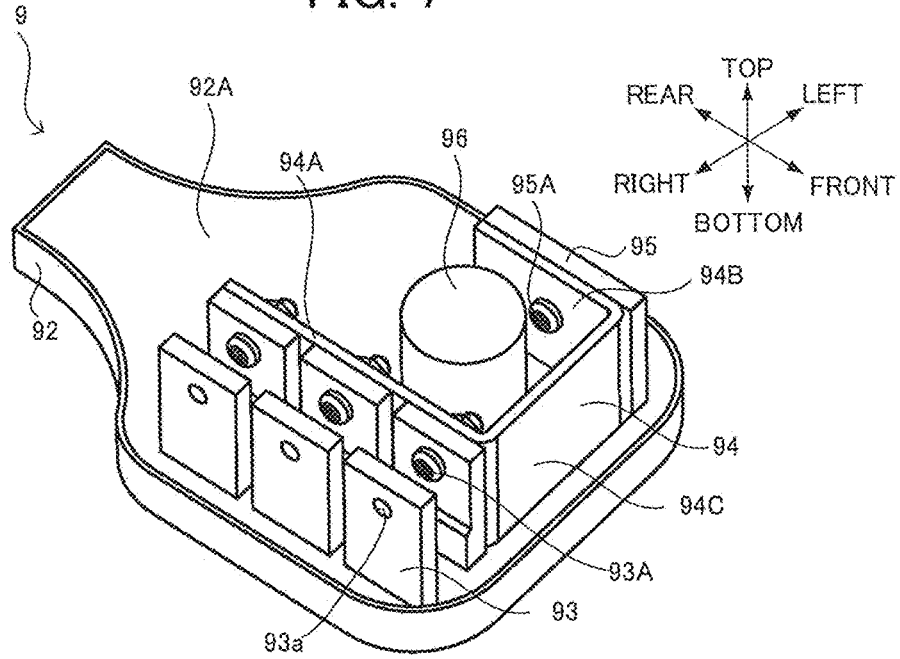
FIG. 7 is a front perspective view showing a circuit board unit in the shear wrench according to the first embodiment.
Figure 8:
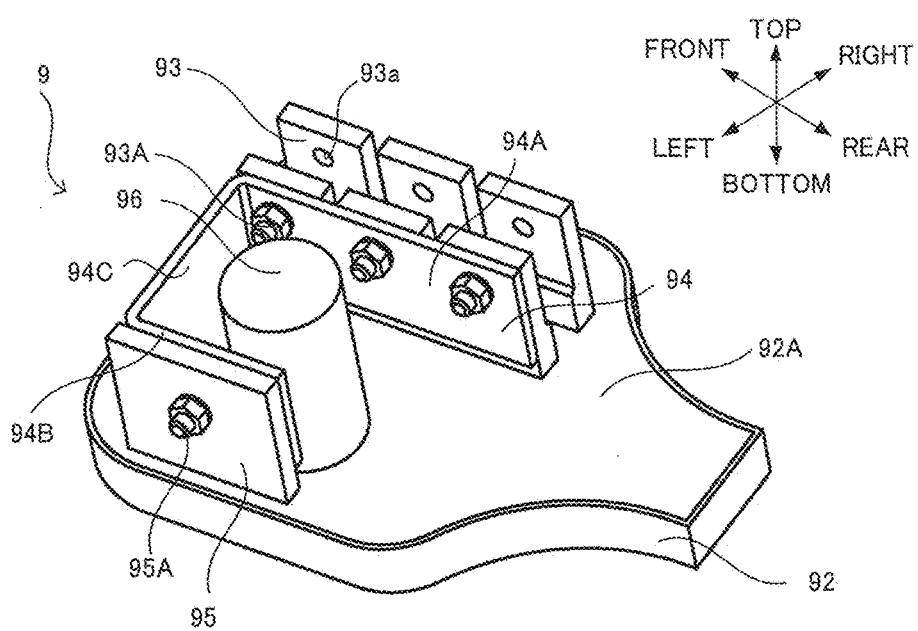
FIG. 8 is a rear perspective view showing the circuit board unit in the shear wrench according to the first embodiment.

An outer surface of the switching element 93 is entirely covered with conductive metal. As shown in FIGS. 7 and 8, the switching element 93 has an upper portion formed with a pinhole 93a penetrating in right-to-left direction. The switching elements 93A4-93A6 on the array B have a leftward long side surface fixedly connected to a switching element connecting part 94A of the heat releasing member 94 described later by a bolt 93A inserted into the pinhole 93a (FIG. 9). A heat releasing grease is applied between the switching element 93 and the heat releasing member 94 to firmly fix with each other and improve heat transfer therebetween. Even if the switching elements 93A1-93A3 on the array A interrupt cooling air from the intake port 2c, the switching elements 93A4-93A6 on the array B can be sufficiently cooled because of the connection to the heat releasing member 94. Further, the array A is disposed adjacent to the array B so that the switching elements 93A1-93A6 are disposed at one location on the circuit board 91, whereby components on the circuit board 91 can be collectively allocated and a compact circuit board can be achieved.

Figure 11:
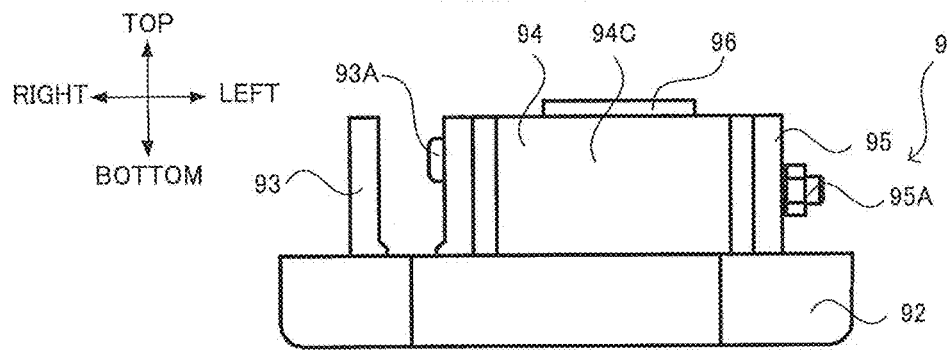
FIG. 11 is a front view showing the circuit board unit in the shear wrench according to the first embodiment.
Figure 12:
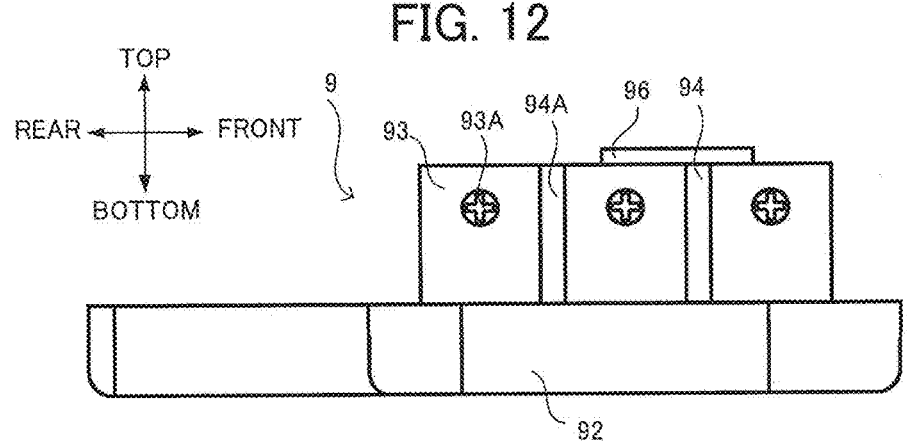
FIG. 12 is a right side view showing the circuit board unit in the shear wrench according to the first embodiment.
Figure 13:
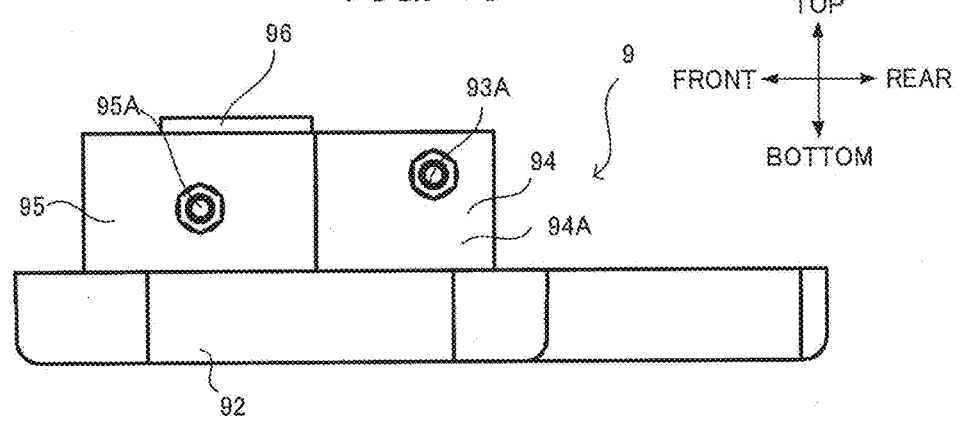
FIG. 13 is a left side view showing the circuit board unit in the shear wrench according to the first embodiment.

The heat releasing member 94 is made of aluminum and has a cross-section substantially like a letter L as viewed from top (FIG. 9). The heat releasing member 94 includes the switching element connecting part 94A connecting to the switching element 93, a diode bridge connecting part 94B connecting to the diode bridge 95, and a connecting part 94C connecting the switching element connecting part 94A to the diode bridge connecting part 94B. As shown in FIGS. 10 and 11, the heat releasing member 94 has an upper end portion flushed with an upper end portion of the switching element 93, thereby ensuring a space immediately above the switching element 93 to accommodate a cable (not shown). As shown in FIGS. 1 and 8, the heat releasing member 94 has a lower end portion away from the circuit board 91 (urethane resin 92A), thereby avoiding a heat transition from the heat releasing member 94 to the circuit board 91.

The diode bridge 95 is disposed adjacent to the left side intake ports 2c on the circuit board 91 (FIG. 3). The diode bridge 95 has a rectangular cross-section in a direction orthogonal to the vertical direction. The rectangular cross-section has a long or major side extending in front-to-rear direction and a short or minor side extending in right-to-left direction. The diode bridge 95 has a rightward long side surface fixedly connected to the diode bridge connecting part 94B by a bolt 95A, thereby acquiring a sufficient heat release of the diode bridge 95. The diode bridge 95 has a leftward long side surface in confrontation with the intake port 2c to efficiently receive cooling air passing therethrough, so that a cooling efficiency to the diode bridge 95 can be enhanced.

The capacitor 96 is adapted to smooth the electric power supplied from the power cable 25 and located between the switching element 93 and the diode bridge 95.

Next, operation for fastening the high-tension bolt 11 will be described. As shown in FIG. 1, when the high-tension bolt 11 and the nut 12 are not respectively accommodated in the tip accommodating space 61a and the nut accommodating space 63a, the inner socket 61 is urged frontward by the socket spring 62, and the front portion of the inner socket 61 protrudes to the nut accommodating space 63a. The weight spring 53 urges the weight 52 and the rod 51 frontward. The seat portion 52A is accommodated in the seat portion accommodating space 61c, and the pressing portion 52B protrudes to the tip accommodating space 61a.

As shown in FIG. 5, after the high-tension bolt 11 and the nut 12 are temporarily engaged with each other through a steel plate S as a workpiece, the operator sets the shear wrench 1 to the high-tension bolt 11 so as to insert the bolt tip 11A into the tip accommodating space 61a and insert the nut 12 into the nut accommodating space 63a. By accommodating the bolt tip 11A in the tip accommodating space 61a, the bolt tip 11A is brought into abutment with the pressing portion 52B, and the rod 51 move rearward against the urging force of the weight spring 53. Since the seat portion 52A is retracted from the seat portion accommodating space 61c, the inner socket 61 can move rearward relative to the outer socket 63. The inner socket 61, the weight 52, and the rod 51 move rearward against the urging force of the socket spring 62 when the nut 12 is brought into abutment with the inner socket 61. Subsequently, the nut 12 is accommodated in the nut accommodating space 63a. Then, the concave part 51a formed at the rear portion of the rod 51 is caught by the through hole 56a, and the frontward movement of the weight 52 is restricted.

When the operator pulls the trigger 24, the brushless motor 3 is driven and the cooling fan 32 is rotated. Then, cooling air suctioned from the intake ports 2c cools the circuit board unit 9, the circuit board 33, and the brushless motor 3, and is discharged outside of the housing 2 through the outlet port 2a.

At the same time, the drive force is transmitted from the brushless motor 3 to the socket unit 6 via the rotational drive transmission mechanism 4. The inner socket 61 is rotated in a direction opposite to the outer socket 63, and the nut 12 is meshingly engaged with the high-tension bolt 11. The brushless motor 3 has been driven until the bolt tip 11A is wrenched off from the high-tension bolt 11. This reliably ensures that the nut 12 is tightened at a desired torque to the high-tension bolt 11.

When the operator separates the shear wrench 1 from the high-tension bolt 11 after the nut 12 has been tightened to the high-tension bolt 11, the socket spring 62 urges the inner socket 61 frontward. However, as shown in FIG. 6, since the forward movement of the weight 52 is restricted by the engagement between the concave part 51a of the rod 51 and the through hole 56a, the weight 52 is placed at the same position, i.e., the pressing portion 52B is away from the inner socket 61. The bolt tip 11A accommodated in the tip accommodating space 61a is pressed by the tip pressing part 61B, which prevents the bolt tip 11A from falling from the tip accommodating space 61a.

When the operator pulls the lever 23 to move the plate 56 upward against the urging force of the spring 54, the concave part 51a is disengaged from the through hole 56a. Then, the weight 52 instantaneously advances by the urging force of the weight spring 53 and bumps the bolt tip 11A accommodated in the tip accommodating space 61a. As a result, the bolt tip 11A is pushed out from the tip accommodating space to ready for next tightening operation.

With this configuration, since the heat releasing member 94 is firmly connected to the switching elements 93 and the diode bridge 95, the switching elements 93 and the diode bridge 95 can be efficiency cooled on a limited space of the circuit board 91. Thus, breakage of the switching elements 93 and the diode bridge 95 by heat can be avoided.

Further, since the heat releasing member 94 is disposed between the intake port 2c and the outlet port 2a, the cooling air passing from the intake port 2c to the outlet port 2a efficiently cools the heat releasing member 94.

Further, since the connecting part 94C is provided on the heat releasing member 94, the heat releasing member 94 can possess large surface area, thereby efficiently cooling the switching elements 93 and the diode bridge 95.

Further, the switching elements 93A1-93A6 control the supply of the electric power to the coils 35A1-35A6 such that the coils 35 opposing with each other with respect to the rotor 34 are simultaneously supplied to the electric power. If the switching element 93A1 supplying the electric power to the coil 35A1 is electrically connected to the switching element 93A4 supplying the electric power to the coil 35A4 opposite to the coil 35A1, electrical short circuiting between the switching element 93A1 and the switching element 93A4 may occur. However, the heat releasing member 94 is only connected to the switching element 93A4-93A6. Thus, the short circuit between the switching elements 93 can be avoided. Further, only one heat releasing member 94 can release heat on all switching elements 93A4-93A6.

Next, a shear wrench 201 according to a second embodiment will be described with reference to FIGS. 14 to 20 wherein like parts and components are designated by the same reference numerals as those shown in the first embodiment to avoid duplicating description.

Figure 16:
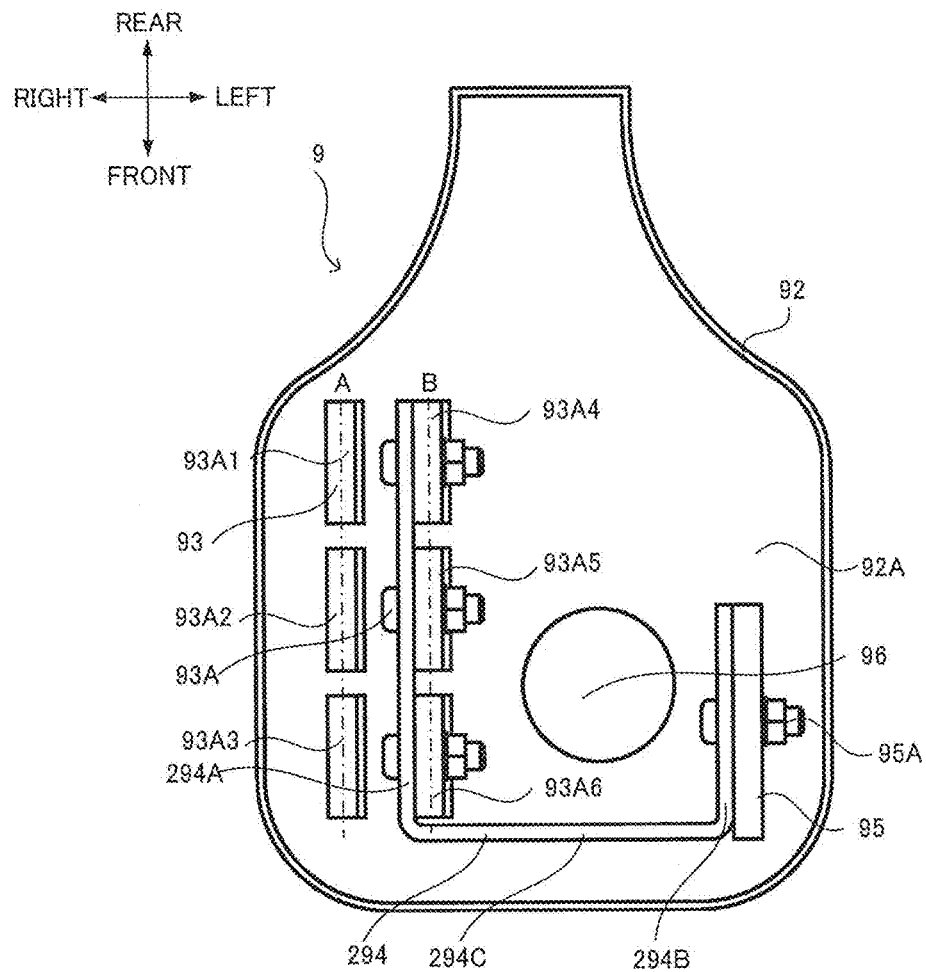
FIG. 16 is a plane view showing the circuit board unit in the shear wrench according to the second embodiment.
Figure 17:
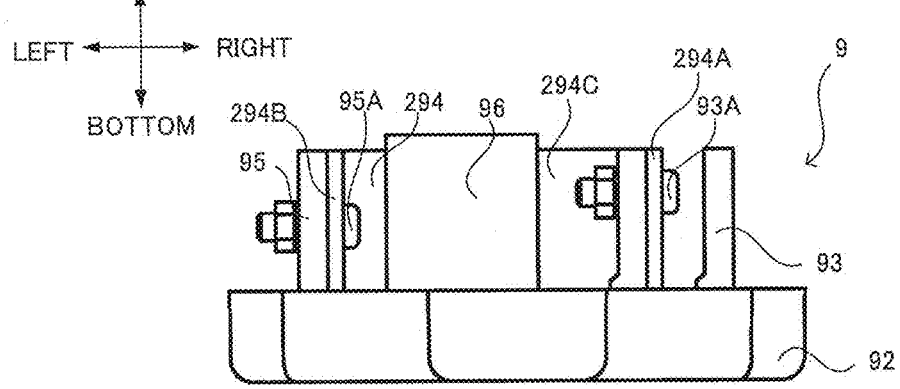
FIG. 17 is a rear view showing the circuit board unit in the shear wrench according to the second embodiment.
Figure 18:
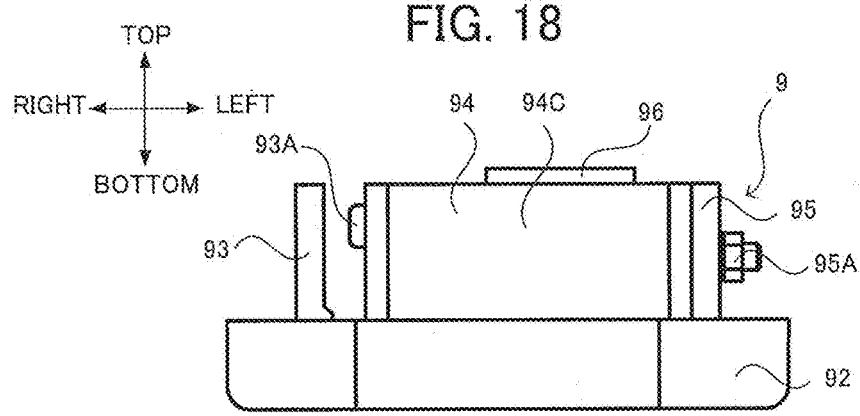
FIG. 18 is a front view showing the circuit board unit in the shear wrench according to the second embodiment.
Figure 19:
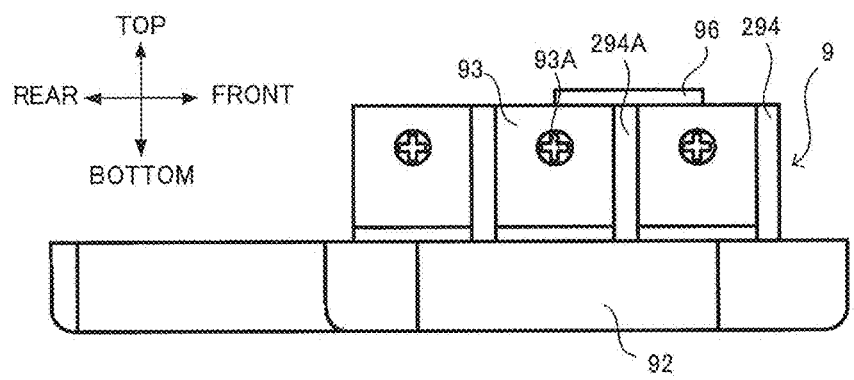
FIG. 19 is a right side view showing the circuit board unit in the shear wrench according to the second embodiment.
Figure 20:
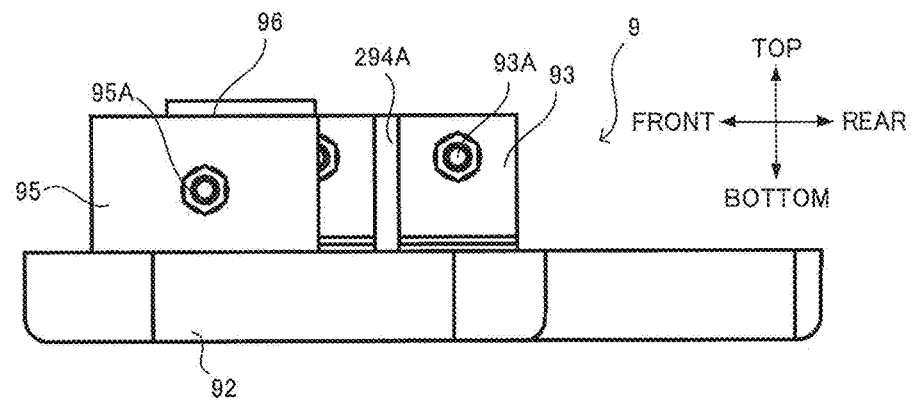
FIG. 20 is a left side view showing the circuit board unit in the shear wrench according to the second embodiment.

A heat releasing member 294 is made of aluminum and has a cross-section substantially like a letter L as viewed from top (FIG. 16). As shown in FIGS. 14 to 20, the heat releasing member 294 includes a switching element connecting part 294A connecting to the switching element 93, a diode bridge connecting part 294B connecting to the diode bridge 95, and a connecting part 294C connecting the switching element connecting part 294A to the diode bridge connecting part 294B. The switching element connecting part 294A is fixedly connected to the right side of the switching elements 93A4-93A6 on the array B by the bolt 93A and the diode bridge connecting part 294B is fixedly connected to the right side of the diode bridge 95 by the bolt 95A. Similar to the first embodiment, the heat releasing grease is applied between the switching element 93 and the switching element connecting part 294A.

Since the switching element connecting part 294A is fixedly connected to the right side of the switching elements 93, a location of the switching element connecting part 294A is nearer to the intake port 2c than the switching element connecting part 94A to the intake port 2c. The switching element connecting part 294A can efficiently receive cooling air and therefore a heat generation in the switching elements 93 can be suppressed. Thus, thermal breakdown of the switching elements 93 and the diode bridge 95 can be avoided. Further, since the connecting part 294C is provided on the heat releasing member 294, the heat releasing member 294 can possess large surface area, thereby efficiently releasing heat from the switching elements 93 and the diode bridge 95.

Next, a shear wrench 301 according to a third embodiment will be described with reference to FIGS. 21 to 27 wherein like parts and components are designated by the same reference numerals as those shown in the first embodiment to avoid duplicating description.

Figure 21:
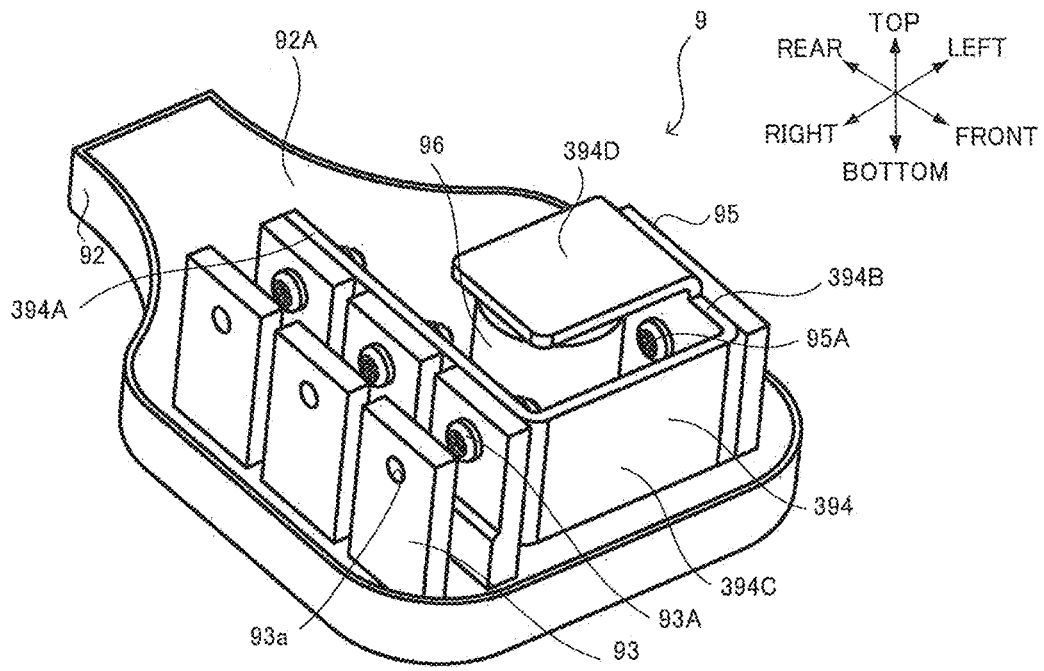
FIG. 21 is a front perspective view showing a circuit board unit in a shear wrench according to a third embodiment of the present invention.
Figure 22:
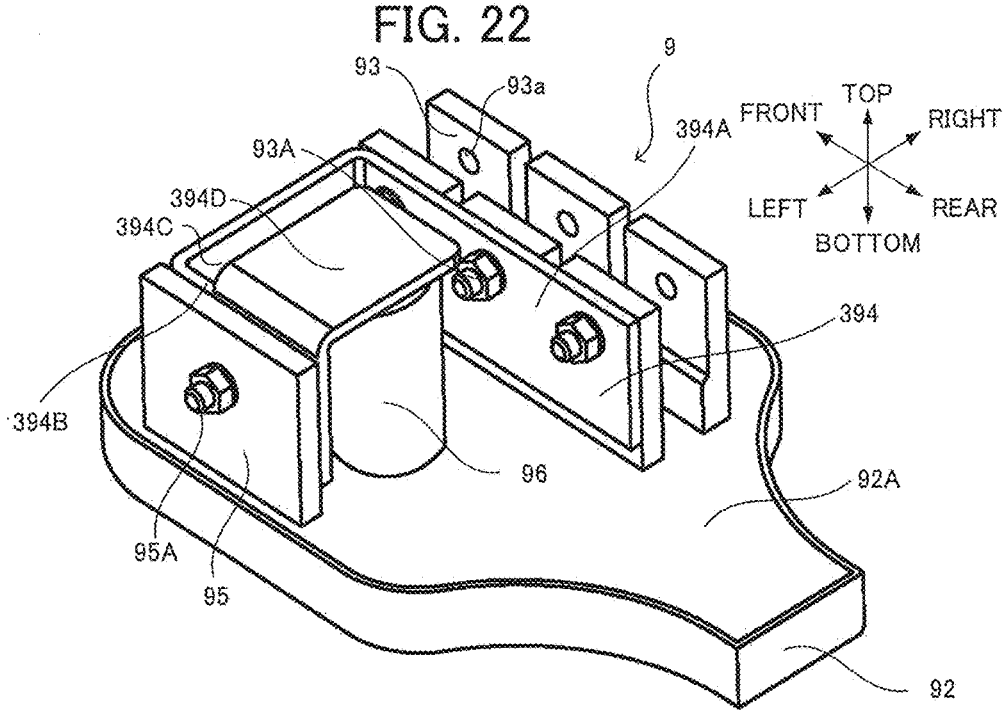
FIG. 22 is a rear perspective view showing the circuit board unit in the shear wrench according to the third embodiment.
Figure 23:
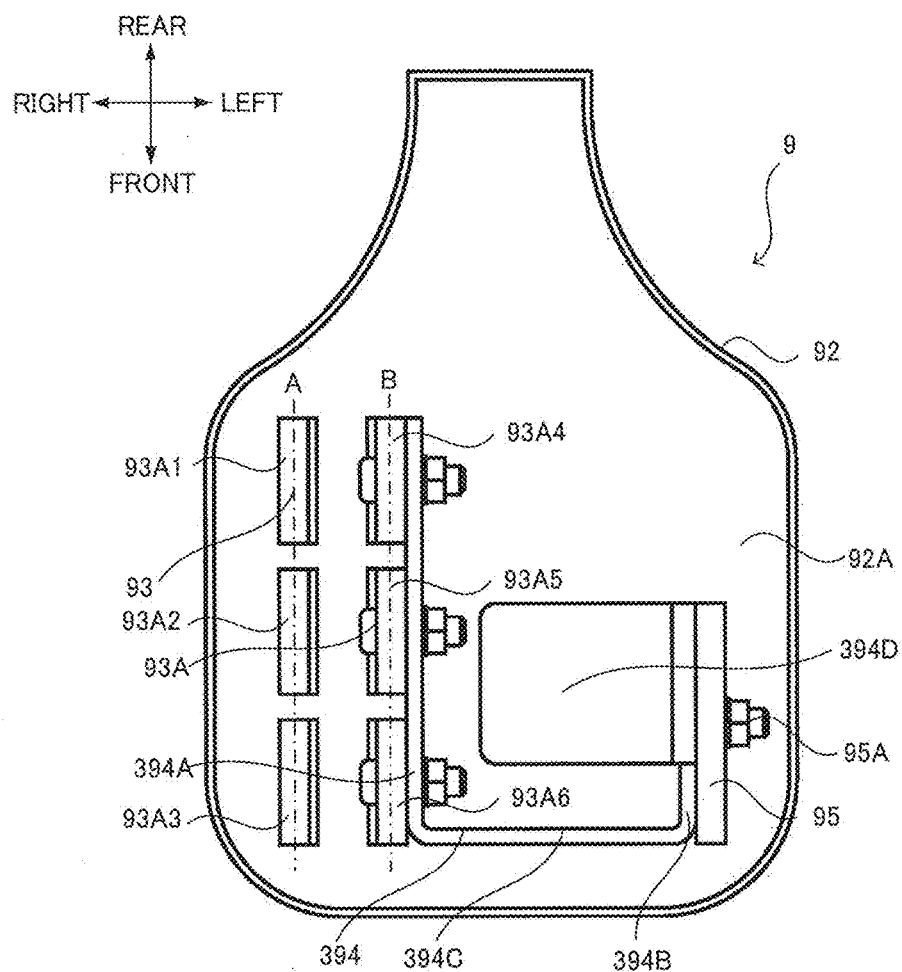
FIG. 23 is a plane view showing the circuit board unit in the shear wrench according to the third embodiment.
Figure 24:
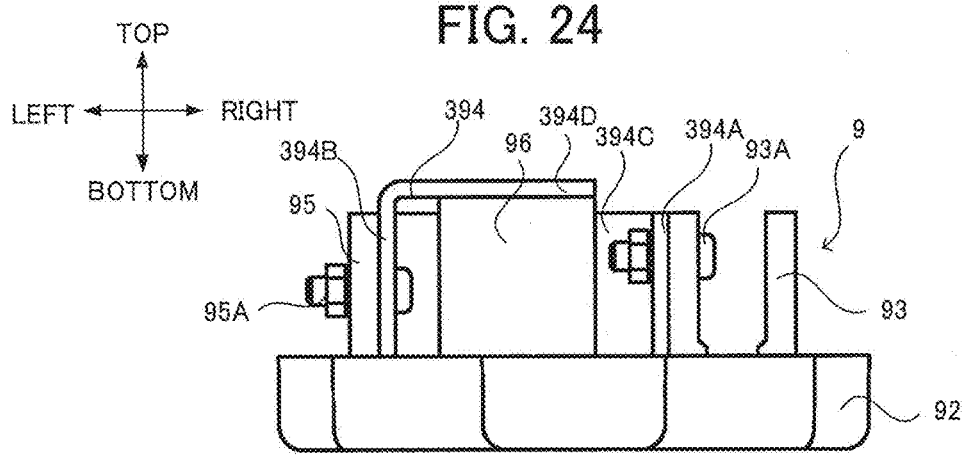
FIG. 24 is a rear view showing the circuit board unit in the shear wrench according to the third embodiment.
Figure 25:
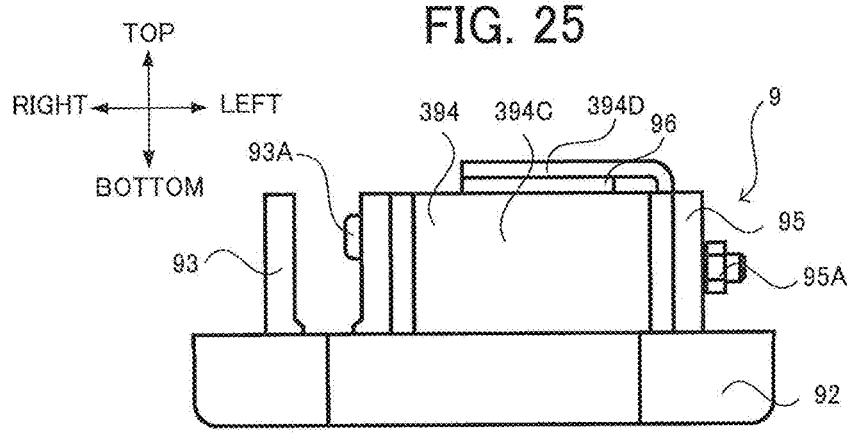
FIG. 25 is a front view showing the circuit board unit in the shear wrench according to the third embodiment.
Figure 26:
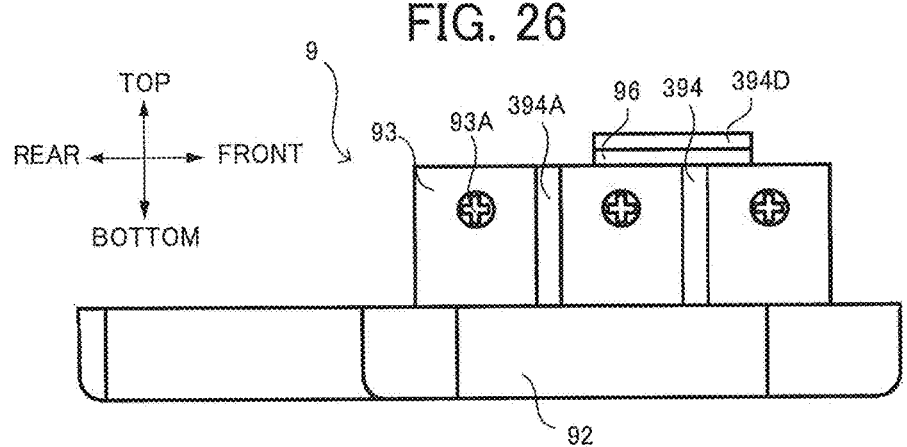
FIG. 26 is a right side view showing the circuit board unit in the shear wrench according to the third embodiment.
Figure 27:
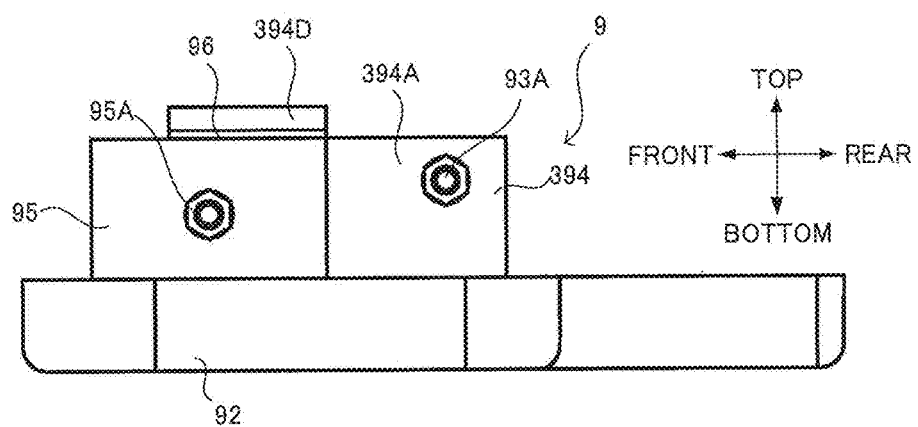
FIG. 27 is a left side view showing the circuit board unit in the shear wrench according to the third embodiment.

As shown in FIGS. 21 to 27, a heat releasing member 394 includes a switching element connecting part 394A connecting to the switching element 93, a diode bridge connecting part 394B connecting to the diode bridge 95, a connecting part 394C connecting the switching element connecting part 394A to the diode bridge connecting part 394B, and a capacitor connecting part 394D connecting to the capacitor 96. As shown in FIG. 23, the switching element connecting part 394A is fixedly connected to the left side of the switching elements 93A4-93A6 on the array B by the bolt 93A and the diode bridge connecting part 394B is fixedly connected to the right side of the diode bridge 95 by the bolt 95A.

As shown in FIGS. 21 and 22, the diode bridge connecting part 394B has a top edge portion from which the capacitor connecting part 394D extends and bends so as to be in contact with an upper surface of the capacitor 96. With this configuration, since the capacitor connecting part 394D connects to the capacitor 96, a heat generated in the capacitor 96 can be efficiently released, thereby preventing the capacitor 96 from being broken by heat. Further, the capacitor connecting part 394D covers the upper surface of the capacitor 96, thereby avoiding a contact between the capacitor 96 and a part of the housing 2 from above when the housing 2 is deformed.

Next, a shear wrench 401 according to a fourth embodiment will be described with reference to FIGS. 28 to 34 wherein like parts and components are designated by the same reference numerals as those shown in the first embodiment to avoid duplicating description.

Figure 28:
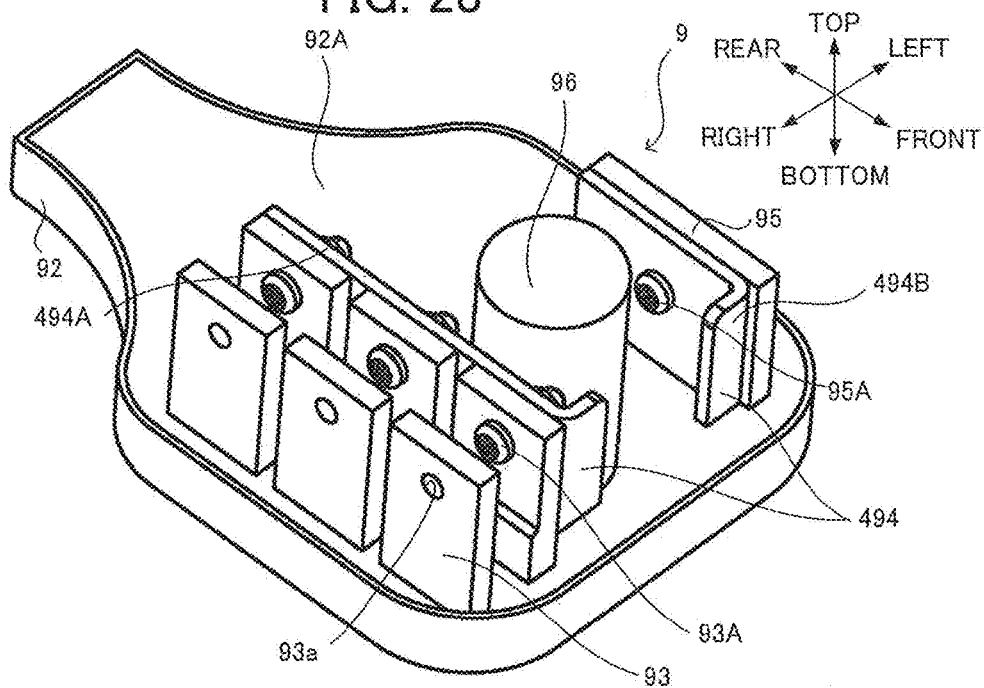
FIG. 28 is a front perspective view showing a circuit board unit in a shear wrench according to a fourth embodiment of the present invention.
Figure 29:
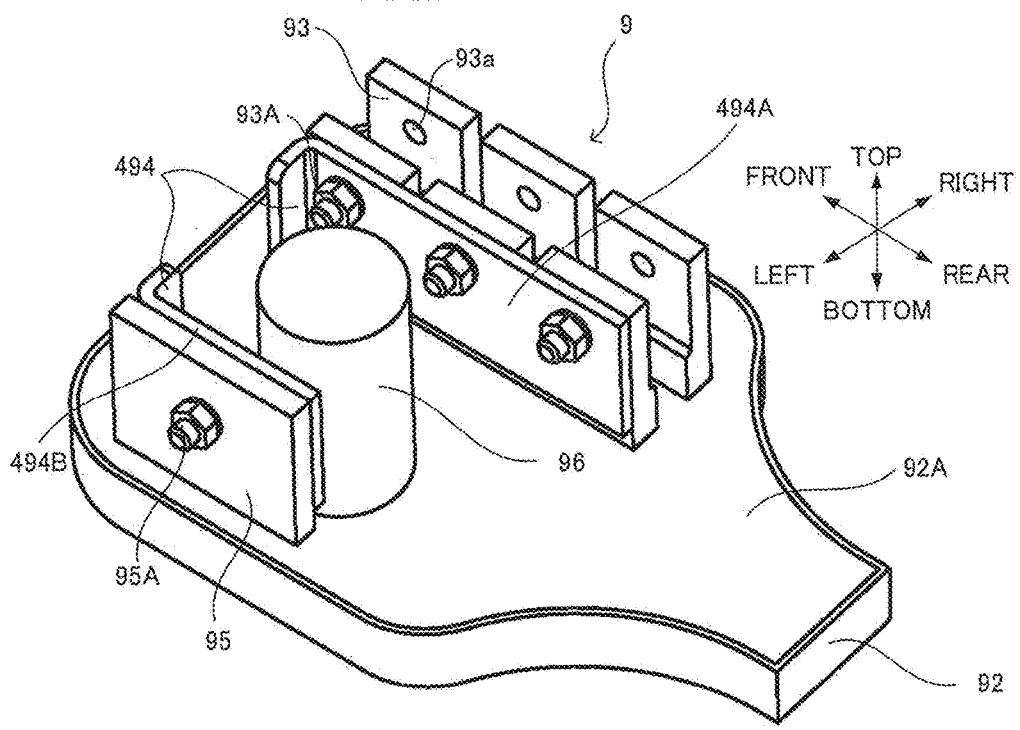
FIG. 29 is a rear perspective view showing the circuit board unit in the shear wrench according to the fourth embodiment.
Figure 30:
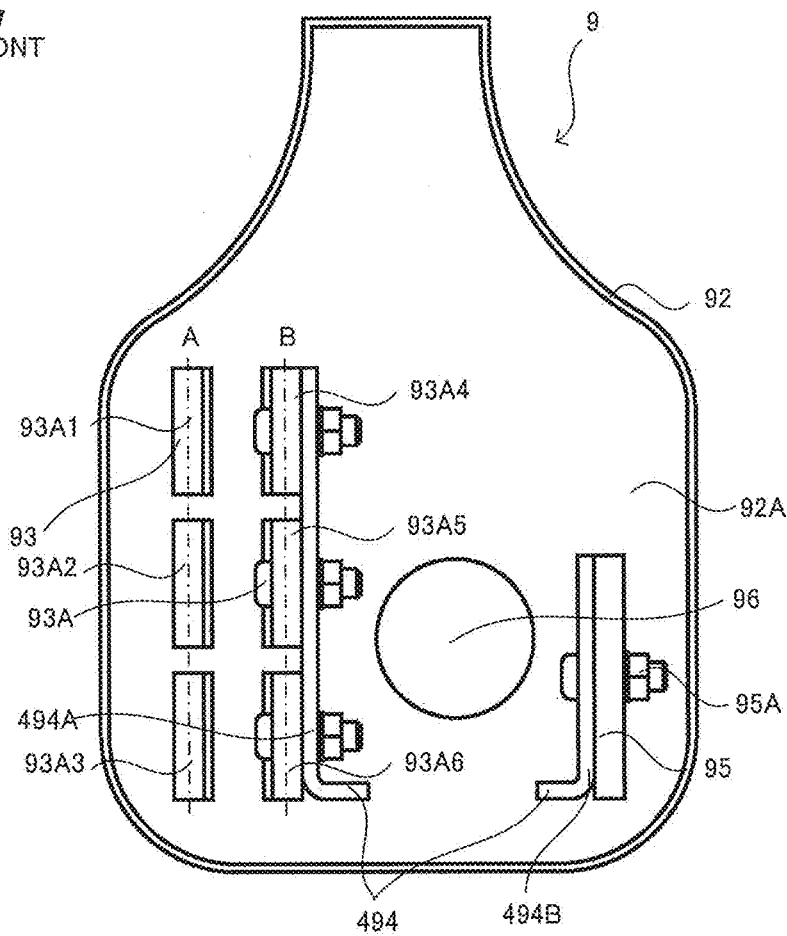
FIG. 30 is a plane view showing the circuit board unit in the shear wrench according to the fourth embodiment.
Figure 31:
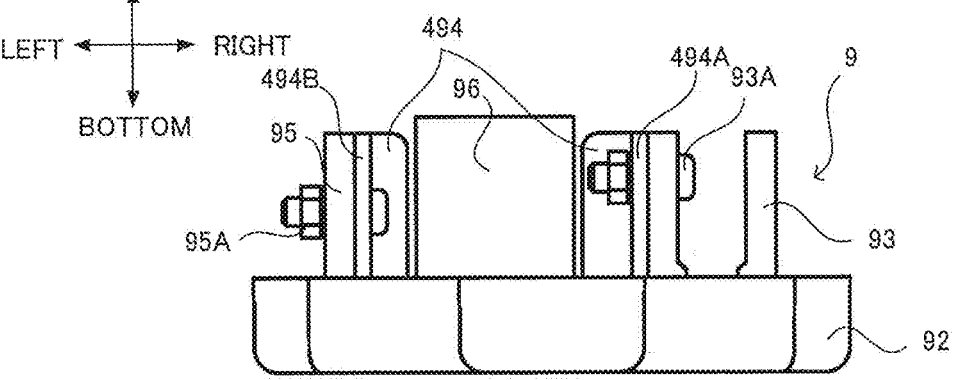
FIG. 31 is a rear view showing the circuit board unit in the shear wrench according to the fourth embodiment.
Figure 35:
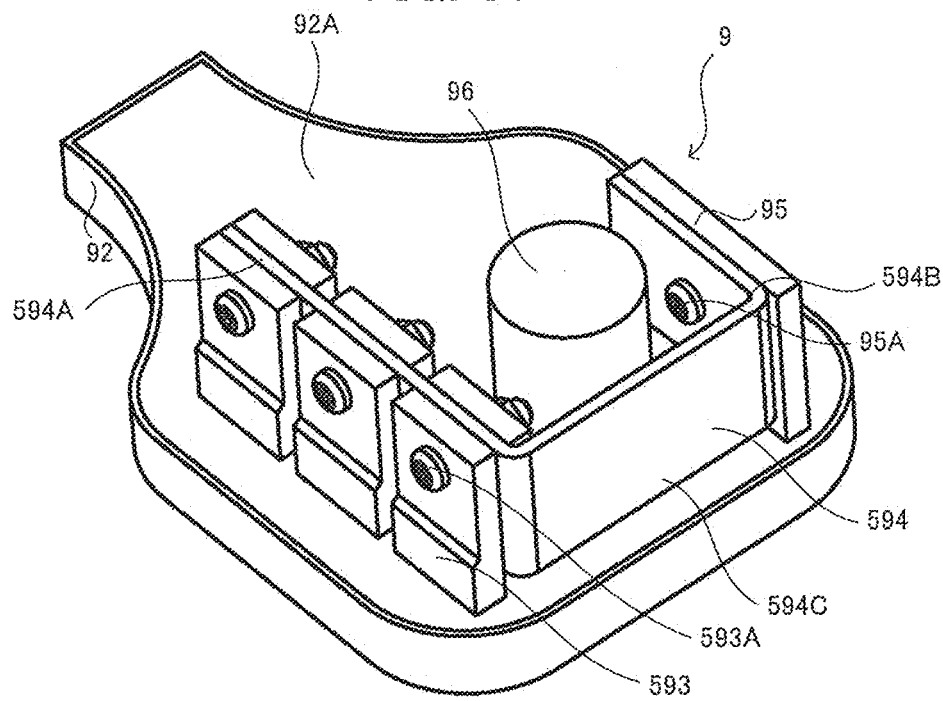
FIG. 35 is a front perspective view showing a circuit board unit in a shear wrench according to a fifth embodiment of the present invention.
Figure 36:
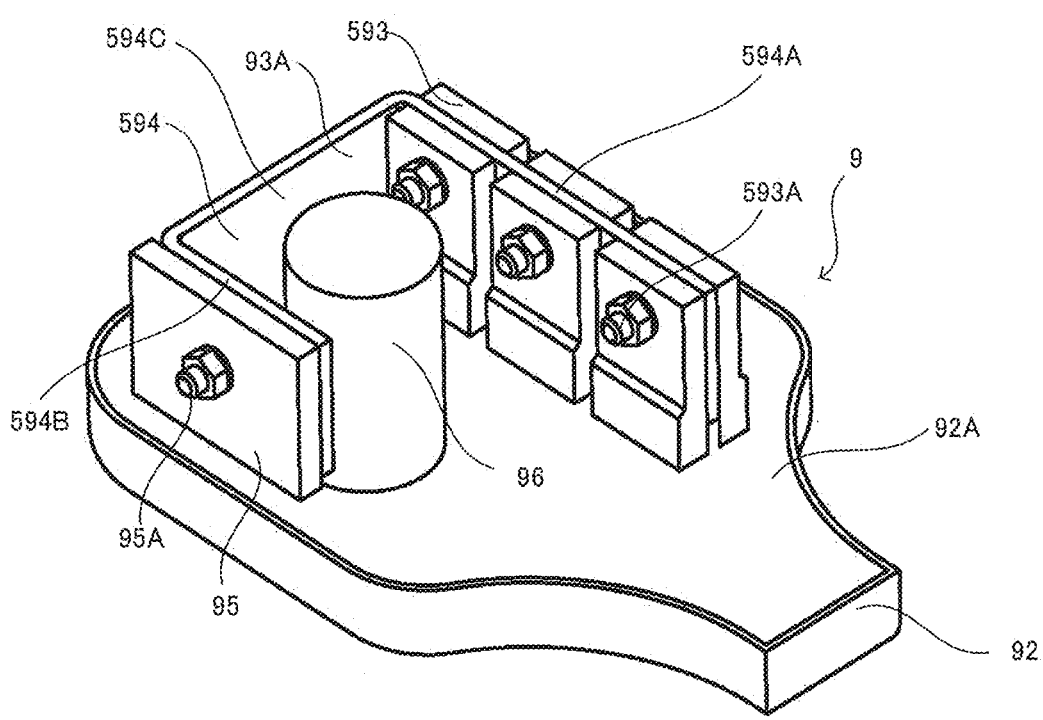
FIG. 36 is a rear perspective view showing the circuit board unit in the shear wrench according to the fifth embodiment.
Figure 39:
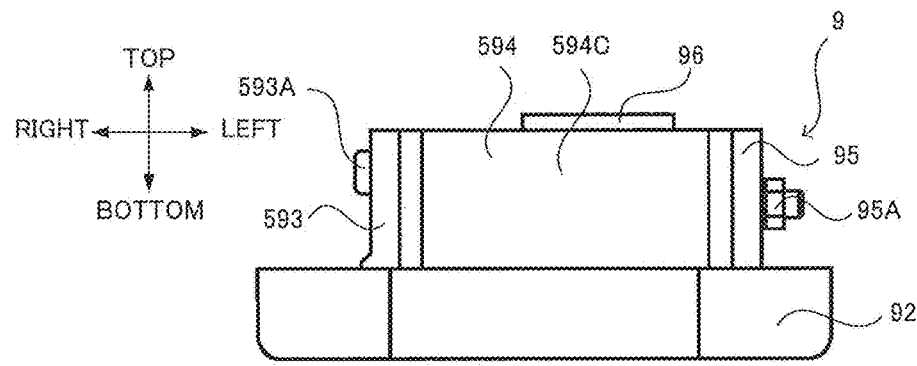
FIG. 39 is a front view showing the circuit board unit in the shear wrench according to the fifth embodiment.
Figure 40:
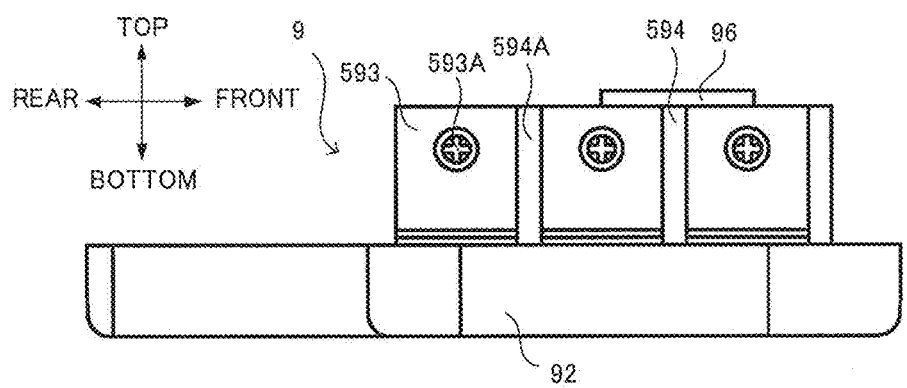
FIG. 40 is a right side view showing the circuit board unit in the shear wrench according to the fifth embodiment.
Figure 41:
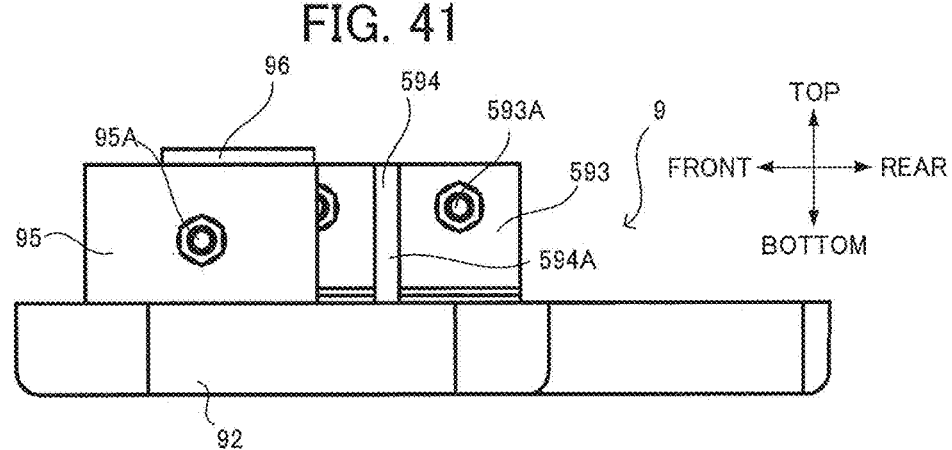
FIG. 41 is a left side view showing the circuit board unit in the shear wrench according to the fifth embodiment.

As shown in FIGS. 28 to 34, a heat releasing member 494 is configured of a switching element connecting part 494A connecting to the switching element 93 and a diode bridge connecting part 494B connecting to the diode bridge 95. As shown in FIG. 28, the heat releasing member 494 is divided into the switching element connecting part 494A and the diode bridge connecting part 494B. As shown in FIG. 30, the switching element connecting part 494A is fixedly connected to the left side of the switching elements 93A4-93A6 on the array B by the bolt 93A and the diode bridge connecting part 494B is fixedly connected to the right side of the diode bridge 95 by the bolt 95A. By the division of the heat releasing member 494, a large working space on the circuit board 91 can be obtained and workability for disposing elements on the circuit board 91 can be enhanced.

Next, a shear wrench 501 according to a fifth embodiment will be described with reference to FIGS. 35 to 41 wherein like parts and components are designated by the same reference numerals as those shown in the first embodiment to avoid duplicating description.

As shown in FIG. 37, the circuit board. 91 is provided with six switching element 593 and a heat releasing member 594. The switching elements 593A1-593A3 are juxtaposed in front-to-rear direction (array A) and the switching elements 593A4-593A6 are juxtaposed in front-to-rear direction (array B) apart from the array A at a prescribed distance. A distance between the array A and the array B of the fifth embodiment is shorter than that of the first-fourth embodiments. Specifically, the distance is substantially equivalent to a thickness of the heat releasing member 594.

The heat releasing member 594 is made of aluminum and has a cross-section substantially like a letter L as viewed from top. As shown in FIGS. 35 to 41, the heat releasing member 594 includes a switching element connecting part 594A connecting to the switching element 593, a diode bridge connecting part 594B connecting to the diode bridge 95, and a connecting part 594C connecting the switching element connecting part 594A to the diode bridge connecting part 594B. As shown in FIG. 37, the switching element connecting part 594A has a left side surface fixedly connected to the right side of the switching elements 593A4-593A6 on the array B, and a right side surface fixedly connected to the left side of the switching elements 593A1-593A3 on the array A by a bolt 593A. To enhance adhesiveness and insulation between the switching elements 593 and the switching element connecting part 594A, an insulation rubber is provided therebetween.

The diode bridge connecting part 594B is fixedly connected to the right side of the diode bridge 95 by the bolt 95A. With this configuration, the heat releasing member 594 is connected not only to the switching elements 593A4-593A6 on the array B but also to the switching elements 593A1-593A3 on the array A, thereby efficiently releasing heat in the switching elements 593A1-593A3. Thus, thermal breakdown of the switching elements 593 and the diode bridge 95 can be avoided.

While the invention has been described in detail with reference to the embodiments thereof, it would be apparent to those skilled in the art that various changes and modifications may be made therein without departing from the spirit of the invention.

In the above-mentioned embodiments, the heat releasing member is made of aluminum. However, other metal material such as copper or stainless steel may be available.

In the above-mentioned embodiments, the heat releasing grease is applied between the heat releasing member and the switching elements. However, the heat releasing member and the switching element may be directly contacted to each other without the heat releasing grease.

In the above-mentioned embodiments, the heat releasing member has a flat outer surface. However, the heat releasing member may have a patterned indented outer surface. With this configuration, the heat releasing member can possess large surface area, thereby enhancing cooling efficiency.

In the first, third, and fourth embodiments, the heat releasing member is connected to the right side of the diode bridge. However, the heat releasing member may be connected to the left side of the diode bridge. With this configuration, the heat releasing member is positioned adjacent to the intake ports, thereby enhancing cooling efficiency.

In the above-mentioned embodiments, the six switching elements as an FET are provided on the circuit board. However, two switching elements may be provided. Further, four or eight switching elements may be provided.

In the above-mentioned embodiments, the diode bridge is configured of four conventional diodes. However, a rectifying device other than the diode bridge may be employed, for example, only one diode may be employed.

In the above-mentioned embodiments, the heat releasing member is fixed to the switching elements. However, the heat releasing member may be fixed to the circuit board.

In the above-mentioned embodiments, the shear wrench as a power tool is employed. However, the above-mentioned embodiment can be available for a hammer tool or a hammer drill.

In the above-mentioned embodiments, the external electric power is supplied by the power cable. However, a rechargeable battery can be used instead of the external power source.

What is claimed is:

1. A power tool comprising:
a brushless motor;
a housing formed with an outlet port and an intake port, the housing providing a cooling air passage extending therein from the intake port to the outlet port, the housing comprising:
  a motor housing accommodating therein the brushless motor and extending in a top-bottom direction;
  a hand-grip part which a user grips, the hand-grip part extending in the top-bottom direction, the hand-grip part being disposed rearward of and connected to the motor housing; and
  a connecting part connecting the motor housing to the hand-grip part;
an output unit disposed above the brushless motor and extending in a front-rear direction;
a power cable configured to be connected to a power source; and
a circuit board unit connected to the power cable and extending in the front-rear direction, the circuit board unit being disposed below the brushless motor and in the connecting part, the circuit board unit comprising:
  a plurality of switching elements for driving the brushless motor; and
  a rectifying device configured to rectify an alternating current from the power source to a direct current,
wherein the intake port is positioned below the brushless motor and opposite to the hand-grip part with respect to the connecting part in the front-rear direction, and the outlet port is positioned at an upper portion of the motor housing, and
wherein the plurality of switching elements and the rectifying device are positioned on the cooling air passage and opposite to the hand-grip part with respect to the connecting part in the front-rear direction.

2. The power tool according to claim 1, wherein the circuit board unit further comprises a circuit board on which the plurality of switching elements and the rectifying device are mounted, and
wherein the intake port is positioned outward of the circuit board in a direction perpendicular to the top-bottom direction and the front-rear direction.

3. The power tool according to claim 1, wherein the circuit board unit further comprises a heat releasing member connected to both the plurality of switching elements and the rectifying device.

4. The power tool according to claim 1, wherein the brushless motor has a rotational axis extending in the top-bottom direction, the circuit board unit being disposed below the brushless motor on the rotational axis.

5. A power tool comprising:
a brushless motor;
a housing formed with an outlet port and an intake port, the housing providing a cooling air passage extending therein from the intake port to the outlet port, the housing comprising:
  a motor housing accommodating therein the brushless motor and extending in a top-bottom direction;
  a hand-grip part which a user grips, the hand-grip part extending in the top-bottom direction, the hand-grip part being disposed rearward of and connected to the motor housing; and
  a connecting part connecting the motor housing to the hand-grip part;
an output unit configured to be driven by the brushless motor;

a power cable configured to be connected to a power source; and a circuit board unit connected to the power cable, the circuit board unit comprising:

a plurality of switching elements for driving the brushless motor;

a rectifying device configured to rectify an alternating current from the power source to a direct current; and a single circuit board on which a plurality of switching element elements and a rectifying device are mounted, wherein the intake port is positioned below the brushless motor and opposite to the hand-grip part with respect to the connecting part in a front-rear direction, and the outlet port is positioned at an upper portion of the motor housing, and wherein the plurality of switching elements and the rectifying device are positioned on the cooling air passage and opposite to the hand-grip part with respect to the connecting part in the front-rear direction.

6. The power tool according to claim 5, wherein the output unit is disposed above the brushless motor and extends in the front-rear direction, and the single circuit board is disposed below the brushless motor.

7. The power tool according to claim 5, wherein the brushless motor has a rotational axis extending in the top-bottom direction, and the plurality of switching elements and the rectifying device are disposed below the brushless motor on the rotational axis.

* * * * *